US012577371B2

(12) United States Patent
De Boer et al.

(10) Patent No.: US 12,577,371 B2
(45) Date of Patent: Mar. 17, 2026

(54) OXIDATIVELY CURABLE COATING COMPOSITION

(71) Applicant: Milliken Industrials Limited, Wigan (GB)

(72) Inventors: Johannes Wietse De Boer, Leiden (NL); Ronald Hage, Leiden (NL); Karin Maaijen, Leiden (NL); Yfranka Petronella Areke Roelofsen, Leiden (NL)

(73) Assignee: Milliken Industrials Limited, Wigan (GB)

( * ) Notice: Subject to any disclaimer, the term of this patent is extended or adjusted under 35 U.S.C. 154(b) by 488 days.

(21) Appl. No.: 17/257,496

(22) PCT Filed: Jul. 4, 2019

(86) PCT No.: PCT/GB2019/051900
§ 371 (c)(1),
(2) Date: Dec. 31, 2020

(87) PCT Pub. No.: WO2020/008204
PCT Pub. Date: Jan. 9, 2020

(65) Prior Publication Data

US 2021/0221975 A1 Jul. 22, 2021

(30) Foreign Application Priority Data

Jul. 5, 2018 (EP) .................................... 18181879

(51) Int. Cl.
*C08K 5/00* (2006.01)
*C08G 63/83* (2006.01)
*C09D 167/08* (2006.01)

(52) U.S. Cl.
CPC ............ *C08K 5/0091* (2013.01); *C08G 63/83* (2013.01); *C09D 167/08* (2013.01)

(58) Field of Classification Search
CPC .............................. C09D 167/08; C08L 67/08
See application file for complete search history.

(56) References Cited

U.S. PATENT DOCUMENTS

| | | | | |
|---|---|---|---|---|
| 2,063,838 A * | 12/1936 | Bruson et al. | ............ | C09F 9/00 562/588 |
| 2015/0337165 A1 | 11/2015 | De Boer | | |
| 2016/0304747 A1 | 10/2016 | Ang | | |

FOREIGN PATENT DOCUMENTS

| | | |
|---|---|---|
| CN | 105073920 | 11/2015 |
| CN | 106062096 | 10/2016 |
| CN | 107109110 | 8/2017 |
| EP | 2954015 A1 | 12/2015 |
| EP | 3037464 A1 | 6/2016 |
| EP | 3272823 A1 | 1/2018 |
| JP | 4200466 B2 | 12/2008 |
| KR | 20160118291 | 10/2016 |
| WO | 2008/114864 A1 | 9/2008 |
| WO | 2014122433 | 8/2014 |
| WO | 2015/082553 A1 | 6/2015 |

OTHER PUBLICATIONS

Koek (Synthesis and properties of hydrophobic [MnIV2(μ-O)3(L)2]2+ complexes, derived from alkyl substituted 1,4,7-triazacylononane ligands, Inorganica Chimica Acta, 295, 1999, pp. 189-199).*

International Search Report and Written Opinion issued in PCT/GB2019/051900 on Aug. 29, 2019 (11 pages).

* cited by examiner

*Primary Examiner* — Brieann R Johnston

(57) ABSTRACT

The present invention relates to an oxidatively curable coating formulation comprising an oxidatively curable alkyd-based resin and unsymmetrically substituted 1,4,7-triazacyclononane-based chelant, which chelant may optionally be complexed with a suitable transition metal ion, particularly manganese. The formulations may be paints or other oxidatively curable coating compositions. The invention also provides methods for making such formulations and compositions resultant from the curing of such formulations.

10 Claims, No Drawings

OXIDATIVELY CURABLE COATING COMPOSITION

CROSS-REFERENCE TO RELATED APPLICATIONS

This application is a national stage patent application of International Application No. PCT/GB2019/051900 filed 4 Jul. 2019 claiming priority to EP 18181879.0 filed 5 Jul. 2018 (now abandoned), both applications fully incorporated by reference in their entirety.

FIELD OF THE INVENTION

The present invention relates to an oxidatively curable coating formulation comprising an oxidatively curable alkyd-based resin and an unsymmetrically substituted 1,4,7-triazacyclononane-based chelant, which chelant may optionally be complexed with a suitable transition metal ion. The formulations may be paints or other oxidatively curable coating compositions. The invention also provides methods for making such formulations and compositions resultant from the curing of such formulations.

BACKGROUND OF THE INVENTION

Alkyd resins are a well understood and dominant binder in many oxidatively curable paints and other solvent-based coatings. Alkyd emulsion paints, in which the continuous phase is aqueous, are also widely available commercially. Alkyd resins are produced by the reaction of polyols with carboxylic acids or anhydrides. To make them susceptible to what is commonly referred to as a drying process, some alkyd resins are reacted with unsaturated triglycerides or other source of unsaturation. Plant and vegetable oils, such as linseed oil, are frequently used as the source of triglycerides. In these drying processes, unsaturated groups, in particular carbon-carbon double bonds, can react with oxygen from the air, causing the oils to crosslink, forming a three-dimensional network, and harden. This oxidative curing process, although not drying, gives the appearance of drying and is often and herein referred to as such. The length of time required for drying depends on a variety of factors, including the constituents of the alkyd resin formulation and the amount and nature of the liquid continuous phase (e.g. solvent) in which the alkyd resin is formulated.

Film formation results from the autoxidation and polymerisation chemistries that occur during the drying of alkyd-based resins. It will proceed in the absence of catalysis. However, it is customary to include in formulations of curable resins small, i.e. catalytic, quantities of optionally organic metal salts, often referred to as metal driers, which catalyse the polymerisation of unsaturated material so as to form the three-dimensional network.

Driers used for solvent-based coatings typically include alkyl carboxylates, typically $C_6$-$C_{18}$ carboxylates, of metals such as cobalt, manganese, lead, zirconium, zinc, vanadium, strontium, calcium and iron. Such metal carboxylates are often referred to as metal soaps. Redox-active metals, such as manganese, iron, cobalt, vanadium and copper enhance radical formation, and thus the oxidative curing process, whilst so-called secondary driers (sometimes referred to as auxiliary driers), such as complexes based on strontium, zirconium and calcium, enhance the action of the redox-active metals. Often these soaps are based on medium-chain alkyl carboxylates such as 2-ethyl-hexanoate. The lipophilic units in such soaps enhance the solubility of the drier in solvent-based paints and other oxidatively curable coating compositions.

As well as metal soaps, a variety of metal driers that are redox metal complexes containing organic ligands can be used as driers, for example manganese complexes comprising 2,2'-bipyridine.

Whilst cobalt driers have been employed for many years as paint driers, there is a desire to develop alternatives, not least since cobalt soaps may need to be registered as carcinogenic materials. Iron- and manganese-based paint driers in particular have received considerable attention in recent years in the academic and patent literature as alternatives to cobalt-based driers. For some recent scientific publications addressing this topic in detail see publications by J H Bieleman (in *Additives in Plastics and Paints, Chimia,* 56, 184-190 (2002)); J H Bieleman (*Macromol. Symp.,* 187, 811-822 (2002)); and R E van Gorkum and E Bouwman (*Coord. Chem. Rev.,* 249, 1709-1728 (2005)).

WO 03/093384 A1 (Ato B.V.) describes the use of reducing biomolecules in combination with transition-metal salts or complexes based on pyrazoles, aliphatic and aromatic amines, 2,2'-bipyridine, 1,10'-phenanthroline and 1,4,7-trimethyl-1,4,7-triazacyclononane ($Me_3TACN$).

WO 03/029371 A1 (Akzo Nobel N.V.) describes the use of complexes comprising Schiff base compounds to enhance the drying of coatings, in which complexes at least one solubilising group is covalently bound to the organic ligand.

WO 2008/003652 A1 (Unilever PLC et al.) describes the use of tetradentate, pentadentate or hexadentate nitrogen ligands bound to manganese and iron as siccative for curing alkyd-based resins.

Oyman et al. describe the oxidative drying of alkyd paints by $[Mn_2(\mu\text{-}O)_3(Me_3TACN)_2](PF_6)_2$(Z O Oyman et al., *Surface Coating International Part B—Coatings Transaction,* 88, 269 (2005)). WO 2011/098583 A1, WO 2011/098584 A1 and WO 2011/098587 A1 (each DSM IP Assets B.V.) describe the use of a variety of dinuclear manganese complexes with $Me_3TACN$ as ligand for paint drying.

WO 2012/092034 A2 (Dura Chemicals, Inc.) describes the use of a transition metal and a porphyrin based ligand as a siccative for resin compositions.

WO 2012/079624 A1 (PPG Europe BV) describes alkyd-based coating compositions comprising iron- and manganese-containing complexes in combination with potassium salts of an organic acid. WO 2013/045475 A1 (PPG Europe BV) describes compositions comprising modified alkyd binders and iron- and manganese-containing complexes. WO 2015/082553 A1 (PPG Europe BV) describes drier compositions for two oxidisable alkyd-based coating compositions, which compositions comprise at least one iron complex with at least one manganese, cerium, vanadium or copper salt of a carboxylic acid and at least one ligand.

WO 2013/092441 A1 and WO 2013/092442 A1 (both Akzo Nobel Coatings International B.V.) describe the use in coating compositions of mixtures of Mn salts with either a molar excess of $Me_3TACN$ as chelant with respect to the Mn salt, or a molar excess of Mn(II) salts with respect to $Me_3TACN$.

The use of mixtures of metal salts and ligands to enhance drying of paint formulations is known. For example, W H Canty, G K Wheeler and R R Myers (*Ind. Eng. Chem.,* 52, 67 (1960)) describe the drying capability of a mixture of 1,10-phenanthroline (phen) and Mn soap, which is similar to that of prepared Mn-phen complexes. Mixtures of 2,2'-bipyridine (bpy) and manganese soaps show a better drying performance than manganese soaps without bpy (see P K Weissenborn and A Motiejauskaite, *Prog. Org. Coat.,* 40, 253 (2000)). Also, R van Gorkum et al. (*Inorg. Chem.,* 43, 2456 (2004)), describe that the addition of bpy to Mn(acetylacetonate)$_3$ gives an acceleration in the drying performance, and attribute this to the formation of manganese-bipyridine complexes. The use of manganese complexes with acetylacetonate and bidentate nitrogen donor ligands in paint drying has also been described in EP 1382648 A1 (Universiteit Leiden).

It may be inferred from the recent literature, including patent literature, published in the field of oxidatively curable coating formulations, for example in some of the aforementioned patent applications, that in general manganese complexes containing 1,4,7-trialkyl-1,4,7-triazacyclononane ligands give good curing. However, as identified in for example in WO 2016/102464 A1 (Akzo Nobel Coatings International B.V.), manganese complexes with 1,4,7-trialkyl-1,4,7-triazacyclononane may give to rise to yellowing of the alkyd coating when, after curing, left in the dark. In WO 2016/102464 A1 there is described the use of an alkyd-stabilized non-aqueous dispersion of particles of addition polymer in a non-aqueous liquid phase comprising alkyd.

Nevertheless, there is still ample scope in the art for the development of alternative driers for use in coating compositions, which function satisfactorily as driers, whilst nevertheless addressing the problem in the art of yellowing (sometimes referred to in the art as dark yellowing) of cured coating compositions over time. The present invention is intended to address this.

SUMMARY

We have surprisingly found that, by modifying the structure of active manganese-based driers, improvements are conferred on oxidatively curable coating formulations. In particular, dark yellowing occurs to a lesser extent in coatings comprising the driers we described herein (i.e after curing of the coatings). In particular, we have found that transition metal complexes, for example manganese ion-containing complexes, comprising unsymmetrically N,N',N''-substituted 1,4,7-triazacyclononane-based ligands, in particular ligands based on the 1,4,7-triazacyclononane motif that have two different or three different substituents on the nitrogen atoms, lead to less dark yellowing than manganese complexes containing the symmetrical 1,4,7-triazacyclononanes, in particular 1,4,7-trimethyl-1,4,7-triazacyclononane on which the prior art is focused. Moreover, driers comprising such ligands are still effective in accelerating the curing of oxidatively curable coating formulations, and are comparable with driers based on 1,4,7-trimethyl-1,4,7-triazacyclononane.

Viewed from a first aspect, therefore, the invention provides a formulation comprising an oxidatively curable alkyd-based curable resin and a chelant of the formula (I):

(I)

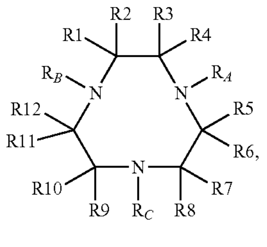

wherein:

each of $R_A$, $R_B$, and $R_C$ is independently selected from the group consisting of $C_{1-24}$alkyl, $C_{6-18}$aryl and $C_{6-18}$aryl$C_{1-6}$alkyl, wherein the aryl moieties of any $C_{6-18}$aryl or $C_{6-18}$aryl$C_{1-6}$alkyl groups are optionally substituted with one or more groups selected from the group consisting of $C_{1-4}$alkyl, Cl, Br and $NO_2$ groups, with the proviso that $R_A$, $R_B$ and $R_C$ are not all the same; and each of $R_1$-$R_{12}$ is independently selected from the group consisting of H, $C_{1-4}$alkyl and hydroxy$C_{1-4}$-alkyl.

The chelant in the formulation may or may not be part of a complex comprising a suitable transition metal ion.

Viewed from a second aspect, the invention provides a method of preparing a formulation according to the first aspect of the invention, the method comprising contacting a composition comprising an alkyd-based resin with a composition comprising a chelant of formula (I). The chelant in the composition comprising it may or may not be part of a complex comprising a suitable transition metal ion.

Viewed from a third aspect, the invention provides a composition resultant from curing of a formulation of the first aspect of the invention, or from curing of a formulation obtainable according to the second aspect of the invention.

Viewed from a fourth aspect, the invention provides a kit comprising a formulation according to the first aspect of the invention or obtainable according to the second aspect of the invention, which formulation comprises less than 0.00005% by weight of ions of each of at least manganese, iron, cobalt, vanadium and copper and, separately, a composition comprising transition metal ions selected from the group consisting of manganese, iron, vanadium and copper ions.

Viewed from a fifth aspect, the invention provides a method comprising applying to a substrate a formulation according to the first aspect of the invention, or obtainable according to the second aspect of the invention.

Further aspects and embodiments of the present invention will be evident from the discussion that follows below.

DETAILED DESCRIPTION OF THE INVENTION

As summarised above, the present invention is based, in part, on the recognition that transition metal complexes, for example, of manganese, comprising unsymmetrically N,N',N''-substituted 1,4,7-triazacyclononane-based ligands, or chelants (the terms ligand and chelant are used interchangeably herein), of formula (I), catalyse the curing of oxidatively curable alkyd-based resin formulations effectively. Additionally, cured alkyd-based resin formulations comprising such complexes show reducing tendency towards dark yellowing than would have been expected from the prior art.

The oxidatively curable resin of the formulation is alkyd-based. As noted above, alkyd resins are a well-understood binder class used in film-forming coating compositions. The term coating composition is to be interpreted broadly and embraces, for example, varnishes, primary coats, filling pastes and glazes. Coating compositions may be solvent-based or water based, e.g. emulsions. Typical coating compositions comprise solvent-based air-drying coatings and/or paints for domestic use. According to particular embodiments of the present invention, the formulations of the invention (including the fully formulated oxidatively curable coating compositions described herein) are paints. The formulations of the invention (including the fully formulated oxidatively curable coating compositions described herein)

may comprise inks, for example a metal plate ink, lithographic ink, relief printing ink, screen ink or offset overprinting ink.

By oxidatively curable alkyd-based resin formulations is meant herein liquids that form a continuous solid coating as a consequence of the course of oxidative reactions (curing) and, generally, evaporation of a liquid continuous phase (generally solvent).

Typically, curing results in formation of cross-linkages and other bond formations through reactions involving unsaturated components within alkyd-based resin formulations.

In alkyd-based resin formulations, also referred to herein as alkyd-based formulations, the major binder present is an alkyd. By binder is meant in the art and herein the film-forming (curable) component within curable compositions, i.e. the component within the compositions that forms the desired three-dimensional network upon curing.

Typically the curable component of an oxidatively curable composition (e.g. a formulation of the invention) will comprise between about 1 and about 98% by weight, for example between about 1 and about 90% by weight of the total weight of the composition, e.g. between about 20 and about 70% by weight of the total weight of the composition. At least 50% by weight of the oxidatively curable portion (i.e. of the binder) in an oxidatively curable alkyd-based resin, i.e. from about 50% by weight to about 100% by weight, is curable alkyd resin. Typically, at least 75% by weight of the binder in an oxidatively curable alkyd-based resin, i.e. from about 75% by weight to about 100% by weight (e.g. from about 90% by weight to about 100% by weight), is curable alkyd resin. According to particular embodiments, about 100% by weight of the binder in an oxidatively curable alkyd-based resin is curable alkyd resin. The balance, if any, of the curable (i.e. binder) component may be, for example, curable acrylate, urethane, polybutadiene and epoxy ester resins. The skilled person is aware that introducing quantities of curable binders other than curable alkyds allows the distinct properties of such binders to be introduced to a controllable degree into the ultimate coating resultant from application of a composition, such as an oxidatively curable composition, which may be made from the formulation of the invention.

As described above, oxidatively curable alkyd resins are a well-understood and indeed dominant binder in many oxidatively curable paints (both for commercial and domestic use) and other coating compositions. They are employed, in particular, in solvent-based coating compositions.

Alkyds (used synonymously herein with alkyd resins) are produced by the condensation, typically polycondensation, of polyols with carboxylic acids or anhydrides. To make them susceptible to the so-called drying process, some alkyd resins (i.e. those that are oxidatively curable, present in the formulation of the invention) are reacted with unsaturated triglycerides or other source of unsaturation. Plant and vegetable oils, such as linseed oil, are frequently used as the source of triglycerides. The term oxidatively curable alkyd resin thus generally refers in the art, and herein, to polyesters modified with fatty acids. As is known in the art, alkyd resins are generally prepared via condensation polymerisation reactions between three types of monomers: (i) one or more polyalcohols (also known as polyols), (ii) one or more polybasic acids (also known as polyacids); and (iii) long chain unsaturated fatty acids or triglyceride oils, which confer upon the alkyds the susceptibility towards curing.

Owing to its presence in naturally occurring oils, glycerol is a widely used polyol in the preparation of alkyds. Other examples of suitable polyhydric alcohols include: pentaerythritol, dipentaerythritol, ethylene glycol, diethylene glycol, propylene glycol, neopentyl glycol, trimethylol propane, trimethylol ethane, di-trimethylol propane and 1,6-hexane diol.

Polycarboxylic acids and the corresponding anhydrides, used to synthesise alkyds, comprise aromatic, aliphatic and cycloaliphatic components, which are generally derived from petrochemical feedstocks. Typical examples of such polyacids include: phthalic acid and its regioisomeric analogues, trimellitic acid, pyromellitic acid, pimelic acid, adipic acid, azelaic acid, sebacic acid, maleic acid, fumaric acid and tetra-hydrophthalic acid.

Suitable so-called drying and semi-drying fatty acids or mixture thereof, useful herein, are typically ethylenically unsaturated conjugated or non-conjugated $C_2$-$C_{24}$ carboxylic acids, such as oleic, ricinoleic, linoleic, linolenic, licanic acid and eleostearic acids or mixture thereof, typically used in the forms of mixtures of fatty acids derived from natural or synthetic oils.

By semi-drying and drying fatty acids is meant fatty acids that have the same fatty acid composition as the oils (i.e. the esters) from which they are derived. The classification of the oils is based on the iodine number: for a drying oil the iodine number is >140; for a semi-drying oil the iodine number is ranging between 125 and 140, and for a non-drying oil the iodine number is <125 (see "*Surface Coatings*", part 1, Chapman & Hall, London, page 55, 1993).

Typically, oxidatively curable alkyd-based formulations, both generally and according to the first aspect of the invention, are liquids. More typically still, such formulations are solvent-based, that is to say they comprise an organic solvent (which may be a mixture of solvents) for the binder and, in accordance with the first aspect of the invention, the chelant.

In other words, "solvent-based" implies to the skilled person in this context formulations that are based on organic (i.e. non-aqueous) solvents, i.e. comprising an organic solvent as a liquid continuous phase. Examples of suitable solvents include aliphatic (including alicyclic and branched) hydrocarbons, such as hexane, heptane, octane, cyclohexane, cycloheptane and isoparaffins; aromatic hydrocarbons such as toluene and xylene; ketones, e.g. methyl ethyl ketone and methyl isobutyl ketone; alcohols, such as secondary butanol, isopropyl alcohol, n-butyl alcohol and n-propyl alcohol, glycols such as propylene glycol; alcohol ethers and esters, glycol monoethers, such as the monoethers of ethylene glycol and diethylene glycol; monoether glycol acetates, such as 2-ethoxyethyl acetate; N-methylpyrrolidone; as well as mixtures thereof. Isomeric variants are included. Thus, for example, the term hexane embraces mixtures of hexanes. According to particular embodiments of the invention, the solvent is a hydrocarbyl (i.e. hydrocarbon) solvent, e.g. an aliphatic hydrocarbyl solvent, e.g. solvents comprising mixtures of hydrocarbons. Examples include white spirit and solvents available under the trademarks Shellsol, from Shell Chemicals and Solvesso and Exxsol, from Exxon.

Whilst according to many embodiments of the various aspects of the present invention compositions and formulations are solvent-based, water-based alkyd-based resin formulations and coating compositions are also well known and the compositions and formulations described herein may be water-based (i.e. comprise water as a continuous liquid phase). Accordingly, compositions and formulations described herein may be of alkyd-based resin formulations in the form of emulsions, and may thus comprise a suitable emulsifier, as is well known in the art.

When an alkyd-based formulation or composition is referred to herein as "oxidatively curable", it is to be understood that this term is being used to describe a composition susceptible to the reactions that occur between unsaturated groups (e.g. carbon-carbon double bonds) and oxygen from the air, which reactions constitute oxidative curing and are manifested in hardening and formation of solid coatings obtainable from such compositions or formulations. Thus, an oxidatively curable alkyd-based resin formulation is a formulation capable of oxidative curing, but which has not yet been allowed to cure. In contrast, the composition of the third aspect of the invention is directed towards formulations after curing, i.e. when cured. The formation of the desired coating resultant from curing may be accelerated through the use of catalytic drying, for example by transition metal-based driers, in particular transition metal-based driers comprising a chelant of formula (I).

A characteristic feature of the various aspects of the present invention is the use of a chelant of formula (I). Complexes comprising such a chelant and one or more suitable transition metal ions accelerate the curing of the oxidatively curable formulation of the invention, which acceleration is absent in the absence of suitable transition metal ions.

The nature of the chelants of formula (I) will now be described. It will be understood that more than one such chelant may be used in accordance with the various aspects of the invention. Also, combinations of different chelants of formula (I) and/or with other chelants or siccatives known in the art (such as those described in WO 2008/003652 A1, for example) may be employed. Typically, however, only one kind of chelant will be used.

The chelants, or ligands, of formula (I) are unsymmetrically N,N',N"-substituted 1,4,7-triazacyclononane-based ligands of formula (I). Unsymmetrical substituted N,N',N"-substituted 1,4,7-triazacyclononane means, as is indicated in connection with the first aspect of the invention, that there are at least two, i.e. two or three, different substituents on the three nitrogen atoms of the 1,4,7-triazacyclononane ring of formula (1). Thus, $R_A$ may be the same as $R_B$, and different to $R_C$ or $R_A$ may be different to $R_B$, which may be different to $R_A$ and $R_C$. These substituents may be alkyl, aryl or arylalkyl substituents.

Each $R_A$, $R_B$, and $R_C$ is independently selected from the group consisting of $C_{1-24}$alkyl, $C_{6-18}$aryl and $C_{6-18}$aryl$C_{1-6}$ alkyl, wherein the aryl moieties of any $C_{6-18}$aryl or $C_{6-18}$aryl$C_{1-6}$alkyl groups are optionally substituted with one or more groups selected from the group consisting of $C_{1-4}$alkyl, Cl, Br and $NO_2$ groups, with the proviso that either $R_A$ is different from $R_B$ and $R_C$ with $R_B$ is equal to $R_C$, or $R_A$, $R_B$ and $R_C$ are all different from each other; and $R_1$, $R_2$, $R_3$, $R_4$, $R_5$, $R_6$, $R_7$, $R_8$, $R_9$, $R_{10}$, $R_{11}$, and $R_{12}$ are independently selected from H, $C_{1-4}$alkyl and hydroxy$C_{1-4}$-alkyl.

For the avoidance of doubt, wherever there is reference herein to $R_A$, $R_B$, and $R_C$ being independently selected, this is at all times subject to the overriding proviso that the resultant compound of formula (I) is unsymmetric in the sense that the three substituents attached to the three nitrogen atoms of the 1,4,7-triazacyclononane ring may not all be the same moiety. It is to be noted that the unsymmetrical nature of the compounds of formula (I) may not arise, for example, solely by virtue of unsymmetrical substitution of the three ethylene moieties connecting the three nitrogen atoms of the 1,4,7-triazacyclononane ring to one another (although these three ethylene moieties may, or may not, be different to one another).

The features discussed in the following paragraphs, alone or in combination, as the context permits (i.e. where not conflicting) are typical (but not essential) features of the substituted TACNs (i.e. ligands of formula (I), based on 1,4,7-triazacyclononane (TACN), to which the various aspects and embodiments of the present invention relate:

In particular embodiments, including those in which the aryl moieties of any $C_{6-18}$aryl or $C_{6-18}$aryl$C_{1-6}$alkyl groups are substituted with one or more groups selected from the group consisting of $C_{1-4}$alkyl, Cl, Br and $NO_2$ groups:

$R_A$ is different from $R_B$ and $R_C$ with $R_B$ is equal to $R_C$; and/or each $R_A$, $R_B$, and $R_C$ is independently selected from the group consisting of $C_{1-24}$alkyl, $C_{6-18}$aryl and $C_{6-18}$aryl$C_{1-6}$alkyl, with the proviso that $R_A$ is different to $R_B$ and $R_C$ and $R_B$ is the same as $R_C$; and/or where the aryl moieties of any $C_{6-18}$aryl or $C_{6-18}$aryl$C_{1-6}$ alkyl groups are substituted, as described herein, such substituents will typically (although not necessarily) be $C_{1-4}$alkyl groups.

In more particular embodiments $R_B$ and $R_C$ are the same and selected from $C_{1-24}$alkyl, more particularly from $C_{1-18}$alkyl, yet more particularly from $C_{1-8}$alkyl. According to specific embodiments, $R_B$=$R_C$=$CH_3$.

$R_A$ is typically selected from the group consisting of $C_{2-24}$alkyl, $C_{6-18}$aryl, $C_{6-18}$aryl$C_{1-6}$alkyl, in which the aryl moieties of any $C_{6-18}$aryl or $C_{6-18}$aryl$C_{1-6}$alkyl groups may be substituted with one or more groups selected from the group consisting of $C_{1-4}$alkyl, Cl, Br and $NO_2$ groups, with the proviso (of course) that $R_A$ is not equal to $R_B$ and/or $R_C$.

More preferably $R_A$ is selected from the group consisting of $C_{2-18}$alkyl, $C_{6-10}$aryl and $C_{6-18}$aryl$C_{1-6}$alkyl, wherein the aryl moieties of any $C_{6-10}$aryl or $C_{6-18}$aryl$C_{1-6}$alkyl groups may be substituted with one or more groups selected from the group consisting of $C_{1-4}$alkyl, Cl, Br and $NO_2$ groups, with the proviso that $R_A$ is not equal to $R_B$ and/or $R_C$.

Even more preferably $R_A$ is selected from the group consisting of $C_{2-12}$alkyl, $C_{6-10}$aryl and $C_{6-18}$aryl$C_{1-6}$alkyl, again wherein the aryl moieties of any $C_{6-10}$aryl or $C_{6-18}$aryl$C_{1-6}$alkyl groups may be substituted with one or more groups selected from the group consisting of $C_{1-4}$alkyl, Cl, Br and $NO_2$ groups, with the proviso that $R_A$ is not equal to $R_B$ and/or $R_C$.

Yet more preferably $R_A$ is selected from the group consisting of $C_{4-12}$alkyl, and optionally $C_{1-4}$alkyl-substituted benzyl (for example 4-methylbenzyl, 3,5-dimethylbenzyl, 2,4-dimethylbenzyl and 2,6-dimethylbenzyl, in particular 4-methylbenzyl, 2,4-dimethylbenzyl and 3,5-dimethylbenzyl), and again with the proviso that $R_A$ is not equal to $R_B$ and/or $R_C$.

According to particular embodiments of the invention, the aryl moieties of any aryl or arylalkyl groups, which may constitute $R_A$, $R_B$ or $R_C$, for example $R_A$, are not substituted with one or more $C_{1-4}$alkyl, Cl, Br and $NO_2$ groups. Thus for example, referring to the immediately hereinbefore described embodiments, $R_A$ may be selected from the group consisting of $C_{4-12}$alkyl, and benzyl, and again with the proviso that $R_A$ is not equal to $R_B$ and/or $R_C$.

Each of $R_1$ to $R_{12}$ is preferably independently selected from H and $C_{1-4}$alkyl, more preferably selected from H, methyl and ethyl. Often, according to these and other embodiments of the invention, each of $R_1$ to $R_{12}$ is the same. According to particular embodiments, each of $R_1$ to $R_{12}$ is hydrogen.

Most preferred are chelants with $R_B$=$R_C$=$CH_3$ and $R_A$=benzyl or $C_{4-12}$alkyl.

Particularly preferred chelants are those in which $R_B$=$R_C$=$CH_3$ and $R_A$=benzyl or $C_{4-12}$alkyl; and each of $R_1$ to $R_{12}$ is H, methyl and ethyl, often wherein each of $R_1$ to $R_{12}$ is H.

A person of normal skill in the art is aware of different approaches to make unsymmetrically N,N',N"-substituted 1,4,7-triazacyclononane based ligands (unsymmetric TACNs). Below, a wide variety of different synthetic routes that have been described in academic and patent publications are briefly summarised, to illustrate different routes to obtain unsymmetric TACNs. With this knowledge in the art, the skilled person is able to access unsymmetric TACNs with the desired $R_A$, $R_B$ and $R_e$ groups (and $R_{1-12}$ groups) by selecting the appropriate starting materials. In the description below, TACN denotes 1,4,7-triazacyclononane, with groups bound to the nitrogen atoms of the 1,4,7-triazacyclononane ring indicated with abbreviations before mention of the TACN ring. For example, $Ts_2$HTACN denotes 1,4-ditosyl-1,4,7-triazacyclononane, i.e. in which tosyl (Ts) groups are bound to two nitrogen atoms of the TACN with a hydrogen atom bound to the third nitrogen atom. $H_3$TACN is synonymous with TACN. TACNs denotes 1,4,7-triazacyclononanes, which may comprise substituents on each of the 9 ring atoms (the six carbon atoms and three nitrogen atoms). Where reference is made explicitly herein to triazacyclononane, reference is being made to the parent compound (1,4,7-triazacyclononane).

G Gros and J Hasserodt (*Eur. J. Org. Chem.,* 183-187 (2015)), describe the synthesis of what are referred to as TACNs with $2R_a/2R_b$ N-functionalisation patterns starting from diethylenetriamine. For example, $Bz_2$Et-TACN (Bz=benzyl) can be synthesised using N,N"-disubstituted diethylenetriamine to yield a bicyclic intermediate. In two steps, this intermediate can be converted to a $R_AR_AR_B$TACN derivative, for example $Bz_2$Et-TACN.

J E W Scheuermann et al. (*Org. Biomol. Chem.,* 2, 2664-2670 (2004)) describe the synthesis of unsymmetrical N-substituted chiral TACNs from ditosylethyleneglycol and diethylenetriamine with chiral benzyl, i-propyl and 1-methylpropyl groups on the 2 and 6 positions with tosyl groups on the N and N" atoms and an acetyl group bound on the N' atom. Preparation of different unsymmetric chiral TACN-based ligands from the tosylated TACN derivatives are described in this publication.

General routes to protect nitrogen atoms of TACN selectively, in order to make TACNs with 2 functional groups, have been disclosed by G R Weisman et al. (*J. Chem. Soc., Chem. Comm.,* 886-888 (1987)) using the orthoamide 1,4,7-triazatricyclo[5.2.1.$0^{4,10}$]decane) as intermediate. This approach is exemplified by making the benzyl-adduct of orthoamide 1,4,7-triazatricyclo[5.2.1.$0^{4,10}$]decane, which can be then further functionalised. Such an approach has been used by D Hanke et al. (*Inorg. Chem.,* 32, 4300-4305 (1993)) to make 1,2-bis-(1,4,7-triazacyclonon-1-yl)-ethane, which after reaction with formaldehyde/formic acid yielded 1,2-bis-(4,7-dimethyl-1,4,7-triazacyclonon-1-yl)-ethane.

Unsymmetric TACN-based ligands have also been made after synthesis of $Ts_2$HTACN from $H_3$TACN. Reaction of $Ts_2$HTACN with ditosylethyleneglycol yielded 1,2-bis-(1,4,7-triazacyclonon-1-yl)-ethane (see K Wieghardt et al., *Inorg. Chem.,* 24, 1230-1235 (1985)).

J L Sessler et al. (*Inorg. Chem.,* 29, 4143-4146 (1990)) have described how treatment of $Ts_3$TACN with HBr in acetic acid in the presence of phenol leads to the formation of $TsH_2$TACN in a very high yield (>90%). Reaction with 1 equivalent of tosylchoride led to the formation of $Ts_2$HTACN (which in this paper was further reacted with succinyl chloride to make 1,4-bis-(4,7-bis(p-tolylsulfonyl)-1,4,7-triazacyclonon-1-yl)-butane and then, after reaction with sulfuric acid, 1,4-bis-(p-tolylsulfonyl)-1,4,7-triazacyclonon-1-yl)-butane).

F H Fry et al. (*J. Chem. Soc., Dalton Trans.,* 827-831 (1997)) describe the synthesis of 1,2-bis-(1,4,7-triazacyclonon-1-yl)-ethane (described, inter alia, by K Wieghardt et al. (cf D Hanke et al. and K Wieghardt et al. both supra), followed by reaction with bromoacetic acid to yield the carboxymethyl-substituted ethylene-bridged TACN ligand 1,2-bis[4,7-bis(carboxymethyl)-1,4,7-triazacyclonon-1-yl]-ethane. Similarly, reaction of $MeH_2$TACN with two equivalent of bromoacetic acid, for example, would yield 1,4-bis (carboxymethyl)$_2$-7-methyl-TACN.

A series of $Me_2$RTACN ligands and Mn complexes are those ligands has been prepared by J H Koek et al. (*Inorg. Chim. Acta,* 295, 189-199 (1999)). The ligands with R=isopropyl, cyclopentyl and n-heptyl were made from $TsH_2$TACN (obtained from $Ts_3$TACN via partial detosylation). $Ts_3$TACN was first reacted with HBr/acetic acid, then with formaldehyde/formic acid, and then with $H_2SO_4$, to yield $Me_2$HTACN, which was then reacted with the appropriate aldehyde and $NaCNBH_3$. The second approach was followed for the synthesis of $Me_2$RTACN with R=n-propyl and benzyl via 1,4,7-triazatricyclo[5.2.1.$0^{4,10}$]decane that was subsequently reacted with propyl iodide and benzyl bromide, respectively. Reaction with formaldehyde/formic acid afforded the two ligands (i.e. in which R=n-propyl and benzyl).

TACN ligands with three different R groups attached to the three nitrogen atoms, denoted $R_AR_BR_C$TACN, may be made in a variety of different ways, as described below.

T D Sobiesciak and P Zielenkiewicz (*J. Org. Chem.,* 75, 2069-2072 (2010)) describe synthetic procedures to make $R_AR_BR_C$TACN ligands via the orthoamide 1,4,7-triazatricyclo[5.2.1.$0^{4,10}$]decane.

Also in WO 2014/079953 A1 (Université de Bourgogne and Centre National de la Recherche Scientifique (CNRS)) it is shown that TACN-based ligands with $R_A$, $R_B$ and $R_C$ groups on the N, N', and N" atoms of 1,4,7-triazacyclononane can be made starting from N,N"—$R_AR_C$-diethylenetriamine with two different $R_A$ and $R_C$ groups on the N and N" atoms of diethylenetriamine after which reaction with chloroacetaldehyde and then further functionalisation with a $R_B$ group yields $R_AR_BR_C$TACN type ligands.

In WO 2012/003598 A1 (Unilever plc et al.) is described another approach that can be taken: selective detosylation of $Ts_3$TACN affords $Ts_2$HTACN. $Ts_2$HTACN can also be made from $H_3$TACN and 2 equivalents of tosylchloride, as shown by K Wieghardt et al. (supra (*Inorg. Chem.,* 24, 1230-1235 (1985)). Reaction of $Ts_2$HTACN with a suitable alkyl halide would yield the corresponding alkyl$Ts_2$TACN. For example reaction with 1-bromohexane would yield 1-hexyl-4,7-$Ts_2$TACN.

TACN-based compounds containing three, two or one Ts groups, i.e. $Ts_3$TACN, $Ts_2$HTACN and $TsH_2$TACN, have also been described. Appropriate choice of the right starting materials and reaction sequences can yield $R_AR_BR_C$TACN ligands with desired $R_A$, $R_B$ and $R_C$ groups. Examples of such selective functionalisations of the TACN ring structure are described, for example, (i) by J L Sessler and J W Sibert (*Tetrahedron,* 49(39), 8727-8738 (1993)), (ii) in WO 2012/003598 A1 (supra, Unilever plc et al.), (iii) by K Wieghardt et al. (supra (*Inorg. Chem.,* 24, 1230-1235 (1985)), (iv) by G R Weisman et al. (supra, *J. Chem. Soc., Chem. Comm.,*

886-888 (1987)), (v) by J H Koek et al. (supra, *Inorg. Chim. Acta,* 295, 189-199 (1999)) and (vi) by A J Blake et al. (*J. Chem. Soc., Dalton Trans.,* 3034-3040 (2000)).

$Ts_3$TACN can also be converted to $H_3$TACN (see for example K Wieghardt et al., *Chem. Ber.,* 112, 2220-2230 (1979)), which can then be converted to the orthoamide 1,4,7-triazatricyclo[5.2.1.$0^{4,10}$]decane (see for example T J Atkins (*J. Am. Chem. Soc.,* 102(20), 6364-6365 (1980)).

$R_AR_BR_C$TACN compounds can be prepared, for example, from the orthoamide 1,4,7-triazatricyclo[5.2.1.$0^{4,10}$]decane according to a scheme described by A R Battle and L Spiccia (*Tetrahedron,* 61, 7499-7507 (2005). According to this, 1,4,7-triaza-tricyclo[5.2.1.$0^{4,10}$]decane is reacted with an electrophile of general formula $R_A$—X, followed by hydrolysis to yield the $R_A$-containing formyl derivative ($R_A$)(formyl)(H)TACN. A further reaction with another electrophile (of general formula $R_B$—X) and subsequent hydrolysis would yield $R_AR_B$HTACN and reaction with yet another electrophile (of general formula $R_C$—X) yields $R_AR_BR_C$-TACN.

Related examples of selective functionalisation of the TACN ring structure are described, for example by G R Weisman et al. (supra, *J. Chem. Soc., Chem. Comm.,* 886-888 (1987)), by D Hanke, et al. (supra, *Inorg. Chem.,* 1993, 32, 4300-4305 (1993)), by J H Koek et al. (supra, *Inorg. Chim.* Acta, 295, 189-199 (1999)), by T D Sobiesciak and P Zielenkiewicz (supra, *J. Org. Chem.,* 75, 2069-2072 (2010)), by A Warden et al. (*Org. Lett.,* 3, 2855-2858 (2001)), U.S. Pat. No. 6,646,122B1 (Nuhlen et al. and by A J Blake et al. (*J. Chem. Soc., Chem. Commun.,* 2467-2469 (1994)).

It has also been shown in WO 2014/079953 A1 (supra, Université de Bourgogne and Centre National de la Recherche Scientifique (CNRS)) that TACN ligands with three different R groups (denoted $R_A$, $R_B$ and $R_C$) on the three different nitrogen atoms of 1,4,7-triazacyclononane can be made starting from N,N"—$R_AR_C$-diethylenetriamine with two different R groups ($R_A$ and $R_C$) on the N and N" atoms of diethylenetriamine after which reaction with chloroacetaldehyde and then further functionalisation with a $R_B$ group yields $R_AR_BR_C$TACN type ligands. In a similar example, G Gros and J Hasserodt (supra, *Eur. J. Org. Chem.,* 183-187 (2015)) have described the synthesis of, for example, N,N"-dibenzyl-N'-ethyl-TACN ($Bn_2$EtTACN), using N,N"-disubstituted diethylenetriamine to yield a bicyclic intermediate. This intermediate can be converted in two steps to $R_AR_A$-$R_B$TACN derivatives with (for example) 2 benzyl groups and one ethyl group attached to the 3 different nitrogen atoms of 1,4,7-triazayclononane.

The chelant of formula (I) is typically present in formulations according to the present invention in concentrations of from 0.00005 to 0.5% by weight, often from 0.0001 to 0.1% by weight.

Where percentages by weight are referred to herein (wt % or % w/w), these mean, unless a context clearly dictates to the contrary, percentages by weight with respect to the binder component (i.e. the alkyd-based resin and any other binders present). With an oxidatively curable alkyd-based coating formulation, for example, the combined weights of the binders are those with respect to which weight percentages herein are based. For example, where a formulation according to the first aspect of the invention comprises 0.00005% w/w of chelant of formula (I), this is with respect to the weight of the curable components of the composition (i.e. the weight of the binder(s)).

Often, formulations of the first aspect of the invention will comprise a complex of the chelant of formula (I) with a suitable transition metal ion. However, this needs not necessarily be so. This is because, as is described in WO 2014/122433 A1 (Chemsenti Limited, now Catexel Technologies Limited), there is technical advantageousness in providing an oxidatively curable alkyd-based resin formulation comprising a chelant (used interchangeably herein with the term "chelating agent"), here of formula (I), which formulation is essentially absent at least manganese, iron, cobalt, vanadium and copper ions. These, ions, if present in the formulation, can form together with the chelant a metal drier capable of accelerating oxidative curing.

A manufacturer of an alkyd-based resin formulation suitable for oxidative curing can thus include a chelant of formula (I) in an amount appropriate for a given oxidatively curable alkyd-based resin formulation. Each type of oxidatively curable alkyd-based resin can, and typically does, have different sensitivity towards radical curing and may thus require a particular concentration of a metal drier for optimal curing. However, to determine the appropriate concentration in practice is not straightforward, since a metal drier, for example a manganese-based catalyst, can initiate radical curing before the coating composition (e.g. paint) comprising an oxidatively curable alkyd-based resin formulation (and other components) can be applied, leading to undesirable degradation and/or hardening of the resin formulation. In contrast, a manufacturer of an oxidatively curable alkyd-based resin formulation, as opposed to the manufacture of a fully formulated oxidatively curable coating composition comprising such an oxidatively curable alkyd-based resin formulation, can determine the optimum amount of metal drier for a given alkyd-based resin formulation and add to batches of it a suitable amount of chelant of formula (I) (but not the transition metal ions that allow formation of a catalytically active drier, which are often, but not necessarily, manganese, iron, vanadium or copper ions). An appropriate quantity of transition metal ions can then be added to the resultant formulation by, for example, a manufacturer of a fully formulated coating composition, along with other components to make a fully formulated oxidatively curable coating composition.

Mixing of appropriate chelants of formula (I) with alkyd-based resin formulations in the essential absence of at least manganese, iron, cobalt, vanadium and copper ions which, if present, render these chelants catalytically active as metal driers, affords formulations at least less susceptible to skinning or instability without the requirement to add antiskinning agents and/or to take other specific measures to avoid skinning. Such formulations thus constitute particular embodiments of the first aspect of the invention.

Moreover, we have found that mixing of appropriate chelants of formula (I) with alkyd-based resin formulations in the essential absence of at least manganese, iron, cobalt, vanadium and copper ions is advantageous other than because doing so affords formulations at least less susceptible to skinning or instability without the requirement to add antiskinning agents and/or to take other specific measures to avoid skinning. In particular, we have found that, when formulations of the invention are prepared by contacting a chelant of formula (I) with an alkyd-based resin formulation in the essential absence of at least manganese, iron, cobalt, vanadium and copper ions, the resultant formulations, after they have been contacted with a suitable source of transition metal ions (typically selected from the group consisting of manganese, iron, vanadium and copper ions, e.g. manganese ions), cure more quickly than similar formulations that are prepared by contacting a composition comprising an alkyd-based resin with a composition comprising a well-defined complex comprising the same chelant of formula (I). Such formulations thus constitute further particular embodiments of the first aspect of the invention.

By well-defined complex is meant herein (as the term is used customarily in the art) a complex that has been isolated such that it is susceptible to characterisation (i.e. definition) and analysis (e.g. to determine its structure and degree of purity). In contrast, a complex that is not well-defined is one that is prepared without isolation from the medium (e.g. reaction medium) in which it is prepared. Those formulations according to the first aspect of the invention prepared other than from well-defined complexes cure markedly more quickly is particularly surprising. Such formulations are described in further detail below, in connection with the method of the second aspect of the invention.

The embodiments of the formulation of the first aspect of the invention that are essentially absent at least manganese, iron, cobalt, vanadium and copper ions comprise less than 0.00005% by weight of at least ions of each of manganese, iron, cobalt, vanadium and copper. By this is meant that the formulation of the invention is absent 0.00005% by weight manganese ions, absent 0.00005% by weight iron ions, absent 0.00005% by weight cobalt ions, absent 0.00005% by weight vanadium ions and absent 0.00005% by weight copper ions. An appropriate quantity of suitable transition metal cations (e.g. ions of one or more of manganese, iron, vanadium and copper, more typically of manganese or iron and most typically of manganese) can be added after preparation of such a formulation, for example when introducing optional additional components to form an oxidatively curable coating composition.

Particular formulations of the invention can if desired comprise less than 0.00005% by weight of each of manganese, iron, cobalt, vanadium, copper, titanium, molybdenum, tungsten, cerium and zirconium ions.

Ideally, embodiments of the formulation of the invention that are essentially absent at least manganese, iron, cobalt, vanadium and copper ions are absent any of the transition metal ions specified. Obviously, however, this ideal is in practice impossible to achieve. Accordingly, these formulations are preferably absent of the transition metal ions specified to the greatest extent practicable.

In order to make, in accordance with a method of the second aspect of the invention, a formulation according to the first aspect of the invention, a composition comprising an oxidatively curable alkyd-based resin is contacted with a composition comprising a chelant of formula (I). The composition comprising the chelant of formula (I) that is contacted with the composition comprising the alkyd-based resin may, in some embodiments, comprise a transition metal ion-containing complex comprising the chelant. This may be a well-defined complex or one that is not well-defined. Further, a mixture of well-defined complex and a non-complexed chelant of formula (I) may be employed in the composition comprising the alkyd-based resin. In other embodiments, the composition comprising the chelant of formula (I) is not part of a transition metal ion-containing complex, in which case a source of transition metal ions may, if wished, be added afterwards (or indeed have been formulated together with the alkyd-based resin before addition of the chelant of formula (I)) so as to form a complex comprising the chelant of formula (I) in situ (i.e. within the alkyd-based resin formulation). It will be understood that such a complex may be regarded as not well-defined. Both of these different types of embodiments are described below.

The typical molar ratio between any transition metal ions and the chelant is between about 0.1:1 and about 10:1, often between about 0.3:1 and about 3:1. Often, the molar ratio between chelant and transition metal ions will be about 1:1. However, this need not necessarily be the case. Without being bound to theory, an excess of transition metal ions may be beneficial to allow some adsorption on solid particles without losing too much siccative activity. On the other hand, a stoichiometric excess of chelant may be beneficial to improve regeneration of catalytically active species during curing, which can lead to improved drying (i.e. curing) performance despite using a lower quantity of transition metal ions. Using a stoichiometric excess of chelant can also be advantageous by reducing the intensity of coloured metal complexes. The skilled person will be able to take into account these considerations when preparing oxidatively curable coating compositions, for example formulations of the invention.

The contacting of the method of the first aspect of the invention may be during formulation of fully formulated oxidatively curable alkyd-based resin coating compositions (described below), particularly if it is part of a complex comprising a suitable transition metal ion.

If the chelant of formula (I) is introduced as a transition metal ion-containing complex, the complex may, for example, be either a well-defined complex (synthesised and isolated complex) or a complex (or a mixture of complexes) prepared in situ, for example, by contacting a chelant of formula (I) with a suitable transition metal salt in a suitable solvent, by which is meant that either or both of the chelant and transition metal salt may be in a suitable solvent prior to contact with each other. The salt can be a soap. The resultant complexes-containing mixture may then be contacted with a composition comprising an oxidatively curable alkyd-based resin, which is typically dissolved in an organic solvent described above when describing solvent-based alkyd-based formulations (or emulsified in a water-based liquid such as those described above when describing water-based alkyd-based formulations).

It will be understood from the discussion above concerning the formulations of the first aspect of the invention that, where a complex that is not well-defined is contacted with a composition comprising an alkyd-based resin, in accordance with the method of the second aspect of the invention, such embodiments are noteworthy in relation to both the first and second aspect of the invention. According to such embodiments, there is provided a formulation according to the first aspect of the invention that is obtainable by carrying out a method of the second aspect of the invention in which the chelant is not part of a well-defined complex comprising a suitable transition metal ion (e.g. an ion selected from the group consisting of ions of manganese, iron, vanadium and copper, e.g. a manganese ion). Alternatively, such formulations may be regarded as being obtainable by a method of the second aspect of the invention, the method further comprising providing a chelant of formula (I) as a complex that is obtained, or obtainable, by contacting a chelant of formula (I) with a suitable transition metal salt (which may be a soap) in a suitable solvent. Typically, the resultant mixture is contacted, as is (i.e. without further manipulation, including purification), with the composition comprising the alkyd-based resin. In other words, particular embodiments of the second aspect of the invention comprise contacting the composition comprising the alkyd-based resin with a mixture of a chelant of formula (I) and a suitable transition metal ion-containing salt, typically of a manganese, iron, vanadium, or copper iron, more typically of a manganese or iron ion, and most typically of a manganese ion.

Often, the metal salt used will be a manganese salt, typically of a divalent or trivalent redox state. Upon contacting a manganese (or other transition metal) salt with the chelant, formation of a manganese-chelant complex or complexes (or other transition metal-chelant complexes) takes place.

The transition metal salt used can be a solid, a suspension, or as a solution in a variety of solvents. Typically the salt comprises a manganese (II) or manganese (III) ion although other salts, e.g. manganese (IV) salts may also be used. Such manganese (or other metal ion) salts can be added as solids, suspensions, or as solutions in a variety of solvents. The invention contemplates use of a mixture of metal salts although a single salt is typically used.

In all aspects of the present invention, where the chelant is part of a complex, the complex is typically a manganese complex.

Adding the chelant as a solution can be advantageous in permitting improved and/or easier mixing with the (solution of) binder(s). It may be beneficial to dilute chelant in a suitable solvent before adding to the binder if it is wished to introduce a very small amount of chelant, so greater accuracy of dosing can be achieved.

Depending on the properties of the chelant and the desired resin-chelant formulation, suitable solvents include aliphatic hydrocarbons, such as heptane, water, alcohols, such as ethanol or propylene glycol, or mixtures thereof. The skilled person will be able to easily formulate such solutions, generally using solvent such as those described above.

It will be understood that there is no particular limitation as to the source of the transition metal ions. Typically, however, salts are selected from the group consisting of optionally hydrated $MnCl_2$, $MnBr_2$, $Mn(NO_3)_2$, $MnSO_4$, Mn(acetylacetonate)$_2$, Mn(acetylacetonate)$_3$, $Mn(R_5COO)_3$ (including Mn(acetate)$_3$), $Mn(R_5COO)_2$, $FeCl_2$, $FeCl_3$, $Fe(NO_3)_3$, $FeSO_4$, $(Fe)_2(SO_4)_3$, Fe(acetylacetonate)$_2$, Fe(acetylacetonate)$_3$, $Fe(R_5COO)_3$, and $Fe(R_5COO)_2$, wherein $R_5$ is selected from a $C_1$-$C_{24}$ alkyl. According to particular embodiments, the above-mentioned salts are based on manganese. Where the salt comprises two or three $R_5$ groups, these can be the same or different, although typically they will be the same. Often the salt (including those referred to in the following paragraphs) is a manganese salt, particularly often a Mn(II) salt. The alkyl moieties, by which is meant saturated hydrocarbyl radicals, may be straight-chain or comprise branched and/or cyclic portions. Indeed, throughout the specification, where reference is made to alkyl, unless the context dictates to the contrary, this means a $C_{1-24}$alkyl, which may be straight-chain or branched and may be cycloalkyl or comprise a cyclic portion (e.g. alkyl may be cyclohexylmethyl), for example $C_{1-10}$alkyl or $C_{1-6}$alkyl, e.g. methyl.

Often, the manganese salt is selected from $Mn(R_5COO)_2$, particularly with $R_5COO(^-)$ being selected from acetate, octanoate, 2-ethylhexanoate, neodecanoate (3,3,5,5-tetramethylhexanoate), and naphthenate. Particularly often, a manganese salt is used, which, for example is selected from manganese(octanoate)$_2$, manganese(naphthenate)$_2$, manganese(2-ethylhexanoate)$_2$ and manganese (neodecanoate)$_2$. The invention also contemplates use of a mixture of different redox states of the manganese ions with the same counterion, for example a mixture of manganese(2-ethylhexanoate)$_2$ and manganese(2-ethylhexanoate)$_3$.

The term optionally hydrated is well known in the art. Metal salts often contain water molecules within a crystal lattice, which will remain present unless the hydrated metals salts are subjected to specific drying steps by heating or drying under reduced pressure. However, partially or fully dehydrated metal salts can also be used. For example, manganese (II) acetate, and manganese (II) chloride can be bought as tetrahydrate salts or as dehydrated salts. Commercial manganese sulfate is available in both tetrahydrate and monohydrate forms.

Often these transition metal salts are commercially available as solutions, particularly if they are of the formula $Mn(R_5COO)_2$ described above, for example in hydrocarbon solutions to facilitate dissolution in the solvent-based curable compositions such as paint formulations. However, other solvents may also be used, including alcohols and water (or aqueous solutions), especially for chloride, sulfate and acetate salts of manganese and iron ions.

Formulations of the invention that are essentially absent at least manganese, iron, cobalt, vanadium and copper ions including those within the kits of the invention, may be prepared by contacting a chelant of formula (I) with (e.g. adding it to) an oxidatively curable alkyd-based binder, typically dissolved in an organic solvent described above (or emulsified in a water-based liquid), as described above. The chelant may be added as a pure material to the resin(s), or as a solution. Adding the chelant as a solution can be advantageous in permitting improved and/or easier mixing with the (solution of) binder(s). It may be beneficial to dilute chelant in a suitable solvent before adding to the binder if it is wished to introduce a very small amount of chelant, so greater accuracy of dosing can be achieved. Depending on the properties of the chelant and the desired resin-chelant formulation, suitable solvents include aliphatic hydrocarbons, such as heptanes, water, alcohols, such as ethanol or propylene glycol, or mixtures thereof. The skilled person will be able to easily formulate such solutions, generally using a solvent such as those described above.

It will be understood from the discussion above concerning the formulations of the invention that, where formulations are prepared in this way, such embodiments are noteworthy in relation to both the first and the second aspect of the invention.

Thus, as described herein, formulations of the invention comprising transition metal ion-containing complexes of the chelant of formula (I) can be prepared, either by contacting an alkyd-based resin composition with such a complex directly, or by contacting an alkyd-based resin composition with chelant that is not part of such a complex and then adding to the resultant formulation a source of transition metal ions. As a still further embodiment of the method of the second aspect of the invention, an alkyd-based resin composition comprising suitable transition metal ions may be contacted with the chelant of formula (I). Generally, formulations of the invention comprising transition metal ions comprise a concentration of between about 0.00007% by weight and about 0.07% by weight, for example about 0.0001% by weight and about 0.05% by weight, e.g. between about 0.005% by weight and about 0.02% by weight, of the suitable transition metal ion, such as those described immediately below.

Transition metal ions to which the chelants of formula (I) may coordinate, to provide metal driers (transition metal ion-containing complexes that can accelerate curing of the oxidatively curable alkyd-based resin in the formulation of the invention) may be, for example manganese, iron, vanadium and copper ions, still more typically manganese ions, or mixtures of any these metal ions. The valency of the metal ions may range from +1 to +6, often from +2 to +5. Examples include metal ions selected from the group consisting of Mn(II), Mn(III), Mn(IV), Mn(V), Cu(I), Cu(II), Cu(III), Fe(II), Fe(III), Fe(IV), Fe(V), V(II), V(III), V(IV), and V(V), for example metal ions selected from the group consisting of Mn(II), Mn(III), Mn(IV), Fe(II), and Fe(III). Most often the metal ions are selected from the group consisting of Mn(II), Mn(III), and Mn(IV), in particular Mn(II) and Mn(III).

Complexes comprising the chelant of formula (I) may, for example, be of the generic formula (II):

$$[M_aL_kX_n]Y_m \qquad \text{(II)}$$

in which:

M represents a metal ion selected from Mn(II), Mn(III), Mn(IV), Mn(V), Fe(II), Fe(III), Fe(IV), Fe(V), Cu(I), Cu(II), Cu(III), Ti(II), Ti(III), Ti(IV), V(II), V(III), V(IV), V(V), Mo(II), Mo(III), Mo(IV), Mo(V), Mo(VI), W(IV), W(V), W(VI), Ce(III), Ce(IV), Zr(IV);

each X independently represents a coordinating species selected from any mono-, bi-, or tri-charged anions and any neutral molecule able to coordinate a metal ion M in a mono-, bi- or tridentate manner;

each Y is independently a non-coordinating counterion;

a represents an integer from 1 to 10;

k represents an integer from 1 to 10;

n represents an integer from 1 to 10;

m represents an integer from 0 to 20; and

L represents a chelant of formula (I), or a hydrate thereof.

According to particular embodiments of formula (II), alone or in combination:

M represents a metal ion selected from Mn(II), Mn(III), Mn(IV), Fe(II), and Fe(III);

X represents a coordinating species selected from $O^{2-}$, $[R^6BO_2]^{2-}$, $R^6COO^-$, $[R^6CONR^6]^-$, $OH^-$, $NO_3^-$, NO, $S^{2-}$, $R^6S^-$, $PO_4^{3-}$, $HPO_4^{2-}$, $H_2PO_4^-$, $[PO_3OR^6]^{3-}$, $H_2O$, $CO_3^{-2}$, $HCO_3^-$, $R^6OH$, $NR^6R^7R^8$, $R^6OO^-$, $O_2^{2-}$, $O_2^-$, $R^6CN$, $Cl^-$, $B^r$–, $I^-$, $OCN^-$, $SCN^-$, $CN^-$, $N_3^-$, $F^-$, $R^6O^-$, $ClO_4^-$, $CF_3SO_3^-$;

Y represents a counterion selected from $ClO_4^-$, $CF_3SO_3^-$, $[B(R^6)_4]^-$, $[FeCl_4]^-$, $PF_6^-$, $R^6COO^-$, $NO_3^-$, $R^6O^-$, $N^+R^6R^7R^8R^9$, $Cl^-$, $Br^-$, $I^-$, $F^-$, $S_2O_6^{2-}$, $OCN^-$, $SCN^-$, $H_2O$, $BF_4^-$, $SO_42^-$;

$R^6$, $R^7$, $R^8$ and $R^9$ each independently represents hydrogen, optionally substituted alkyl or optionally substituted aryl;

a represents an integer from 1 to 4;

k represents an integer from 1 to 10;

n represents an integer from 1 to 4; and m represents an integer from 1 to 8.

By aryl in formula (II) is meant herein a $C_{6-14}$aryl (e.g. phenyl or naphthyl) and by alkyl is meant a $C_{1-24}$alkyl.

Where an alkyl or aryl group is optionally substituted, this may be with one or more substituents independently selected from the group consisting of -halo, —OH, —$OR^{10}$, —$NH_2$, —$NHR^{10}$, —$N(R^{10})_2$, —$N(R^{10})_3^+$, —$C(O)R^{10}$, —$OC(O)R^{10}$, —$CO_2H$, —$CO_2^-$, —$CO_2R^{10}$, —$C(O)NH_2$, —$C(O)NHR^{10}$, —$C(O)N(R^{10})_2$, -heteroaryl, —$R^{10}$, —$SR^{10}$, —SH, —$P(R^{10})_2$, —$P(O)(R^{10})_2$, —$P(O)(OH)_2$, —$P(O)(OR^{10})_2$, —$NO_2$, —$SO_3H$, —$SO_3^-$, —$S(O)_2R^{10}$, —$NHC(O)R^{10}$ and —$N(R^{10})C(O)R^{10}$, wherein each $R^{10}$ is independently selected from alkyl, aryl, arylalkyl optionally substituted one or two or more times with a substituent selected from the group consisting of -halo, —$NH_3^+$, —$SO_3H$, —$SO_3^-$, —$CO_2H$, —$CO_2^-$, —$P(O)(OH)_2$, —$P(O)(O^-)_2$.

According to particular embodiments, a=2 and k=1.

As is known, the ability of metal driers to catalyse the curing of oxidatively curable coating compositions arises from their ability to participate in redox chemistry: the nature of the counterion(s) Y is not of great importance. The choice of these may be affected by the solubility of the complex of metal ions and chelant of formula (I) in a given formulation or composition. For example, counterion(s) Y such as chloride, sulfate or acetate may serve to provide a readily water-soluble complex, if a water-based paint is desired. When using solvent-based (i.e. non-aqueous) compositions, it may be desirable to use larger, less polar counterions such as 2-ethylhexanoate. Suitable counterion(s) Y (and coordinating species X) may be selected without difficulty by the skilled person.

According to particular embodiments, X and Y may be independently selected from the group consisting of bromide, iodide, nitrate, sulfate, methoxide, ethoxide, formate, acetate, propionate, 2-ethylhexanoate, oxide, and hydroxide.

An example of a neutral molecule able to coordinate the metal in a mono-, bi- or tridentate manner is acetonitrile, for example, to afford a complex of the formula $[ML(CH_3CN)_3]Cl_2$.

It will be understood that counterions Y serve to balance the charge resultant from the complex formed by the metal ion(s) M, coordinating species X and chelant(s) L. Thus, if the charge on the complex is positive, there will be one or more anions Y. Conversely, there will be one or more cations Y if the charge on the complex is negative.

It will be understood from the foregoing discussion that complexes of formula (II) embrace dinuclear complexes (i.e. comprising two metal ions M), such as those containing hydroxide, oxo, carboxylate or halide as bridging ligands (with a bridging ligand indicated with mu (p)). As the denticity of the chelant L (i.e. the number of atoms through which it chelates) is three and the metal ions are often 6-coordinate, one or more, often three, bridging molecules may be present. In case there are one or two bridging molecules, a combination of bridging and non-bridging ligands X may be present. Non-limiting examples of dinuclear complexes with three bridging molecules include $[LMn(\mu\text{-}RCOO)_3MnL](RCOO)$ or $[LMn(\mu\text{-}O)(\mu\text{-}RCOO)_2MnL](RCOO)_2$ (wherein RCOO=acetate or 2-ethylhexanoate with L being the chelant according to formula (I), and Mn in its II or III oxidation state). The metal-ligand complex, containing suitable counterion(s) Y, can be contacted with (e.g. added to) an alkyd-based resin so as to form a formulation of the present invention. However, it will be understood from the discussion above that many embodiments of the invention comprise mixing the chelant according to formula (I) with a manganese salt rather than introduction of the chelant in the form of a preformed, well-defined complex such as those described above.

A formulation of the invention can, and generally will, be used in the manufacture of a fully formulated oxidatively curable coating composition. By the term "fully formulated oxidatively curable coating composition" is implied, as is known to those of skill in the art, oxidatively curable formulations that comprise additional components over and above the binder (the oxidatively curable material, which is predominantly oxidatively curable alkyd resin according to the present invention), an aqueous or non-aqueous solvent/liquid continuous phase and any metal driers intended to accelerate the curing process. Such additional components are generally included so as to confer desirable properties upon the coating composition, such as colour or other visual characteristics such as glossiness or mattness), physical, chemical and even biological stability (enhanced biological stability being conferred upon coating compositions by the use of biocides for example), or modified texture, plasticity, adhesion or viscosity.

For example, such optional additional components may be selected from solvents, antioxidants (sometimes referred to as antiskinning agents), additional siccatives (i.e. not comprising chelants of formula (I)), auxiliary driers, colourants (including inks and coloured pigments), fillers, plasticisers, viscosity modifiers, UV light absorbers, stabilisers, antistatic agents, flame retardants, lubricants, emulsifiers (in particular where an oxidatively curable coating composition or formulation of the invention is aqueous-based), antifoaming agents, viscosity modifiers, antifouling agents, biocides (e.g. bactericides, fungicides, algaecides and insecticides), anticorrosion agents, antireflective agents, antifreezing agents, waxes and thickeners. Typically, formulations prepared in accordance with embodiments of the method of the second aspect of the invention will comprise at least an organic solvent, selected from the list of solvents described above and a filler, and generally an antiskinning agent, in addition to the alkyd and optionally other binders and chelant present in the formulation of the invention. The skilled person is familiar with the incorporation of these and other components into oxidatively curable coating composition so as to optimise such compositions' properties.

It will be appreciated that some of these optional additional components possess more than one functional property. For example, some fillers may also function as colourants. The nature of any additional components and the amounts used may be determined in accordance with the knowledge of those of skill in the art and will depend on the application for which the curable coating compositions intended. Examples are provided below but these are intended to be illustrative, not limitative.

When producing a fully formulated oxidatively curable coating composition that is, for example, a paint, one or more antioxidants (customarily referred to in the art as antiskinning agents) are often included to avoid premature curing of the oxidatively curable coating composition prior to its use. Such premature curing may be manifested by, for example, the formation of a skin on or lumpy matter in the oxidatively curable coating composition as a result of curing during storage, for example hardening of the surface of a paint layer in a can, owing to the activity of the siccative with oxygen on the oxidatively curable binder. Antiskinning agents are understood to reduce skinning by quenching radicals formed and/or by inactivation of drier catalysts by binding to one or more of the coordination sites. Examples include, but are not limited to, methylethylketoxime, 2-pentanone-oxime, acetonoxime, butyraldoxime, methylisobutylketoxime, 2-cyclohexylphenol, 4-cyclohexylphenol, t-butyl-hydroquinone, dialkylhydroxylamine, acetylacetonate, ammonia, vitamin E (tocopherol), hydroxylamine, triethylamine, dimethylethanolamine, 2-t-butyl-4-methylphenol, and 2-[(1-methylpropyl)amino]ethanol. According to particular embodiments, the antiskinning agent is selected from the group consisting of methylethylketone-oxime, 2-pentanone-oxime, acetonoxime, butyraldoxime, dialkylhydroxylamine, ammonia, hydroxylamine, triethylamine, dimethylethanolamine, o-cyclohexylphenol, p-cyclohexylphenol and 2-t-butyl-4-methylphenol.

The quantity of antiskinning agent present in an oxidatively curable coating composition is typically between about 0.001 and about 2.5 wt %. The antioxidant or antiskinning agent may be added to an alkyd-based resin formulation, e.g. of the invention, together with (or separately from) the chelant prior to or during the preparation of a fully formulated oxidatively curable coating composition (for example a paint or other coating composition).

Colourants include pigments and inks. Titanium dioxide is a pigment commonly included in many coating compositions, in particular paints.

Fillers may be added to an oxidatively curable coating composition for a number of reasons, for example to bulk out the coating composition and to compare particular properties on the cured composition. Typically, fillers will be inorganic solids that are generally introduced in particulate (finely divided) form. Examples include silica, silicates or clays (for example mica, talc, kaolin), carbonate or other minerals and metal salts or oxides (such as marble, quartzite). Other suitable fillers will be evident to the skilled person.

It may be advantageous if an alkyd resin manufacturer has determined a particular concentration of metal drier that is appropriate for a particular alkyd-based resin formulation for the manufacturer to recommend to users of the formulation an appropriate source of transition metal ions that may be added in order to generate a desired metal drier in situ.

Moreover, according to the fourth aspect of the invention, there is provided a kit comprising a formulation of the invention comprising less than 0.00005% by weight of ions of each of at least manganese, iron, cobalt, vanadium and copper and, separately, a composition comprising a source of suitable transition metal ions, typically ions selected from the group consisting of manganese, iron, vanadium and copper ions, more typically either manganese or iron ions and often manganese ions, particularly often in the form of a salt such as those described above, for admixture to a formulation of the invention. The kit may optionally comprise instructions or other guidance as to methods according to which the formulation and the transition metal ions may be contacted. In this way, the manufacture of a formulation of the invention can, after optimising the nature of the source of transition metal ions, for example by the preparation of a particular solution of a particular transition metal ions salt, optimise the manner in which formulations containing transition metal complexes can be prepared. The preparation of an oxidatively curable alkyd-based coating composition may be by the manufacturer of such compositions (e.g. a paint manufacturer) or by an end consumer of oxidatively curable alkyd-based coating compositions, who can contact a source of transition metal ions with an otherwise fully formulated oxidatively curable alkyd-based coating composition.

It is also within the scope of the current invention that the paint manufacturer, for example, would add commercial metal-soap/chelant mixtures, such as the non-limiting example of Borchers® Dry 0410 (a mixture of bpy with $Mn(neodecanoate)_2$ commercially available from OMG), as a mixture of bpy with $Mn(neodecanoate)_2$. The additional chelant present in the alkyd resin will improve the drying behaviour without causing excessive yellowing which may be occurring if more of the Mn-soap/ligand mixture is added to the paint formulation.

It is also within the scope of the current invention that the paint manufacturer, for example, would add one or more other manganese or iron complexes (well defined or not well defined) with a chelant other than those to which the present invention is directed, such as those disclosed in for example WO 2008/003652 A1 (Unilever PLC et al.), WO 2014/122434 (Catexel Ltd) or WO2017/103620 (Catexel Ltd). Also mixtures with other symmetrically substituted TACN ligands, such as 1,4,7-trimethyl-1,4,7-triazacyclononane may be included (either mixed with a Mn salt or soap or as formulated as a well-defined complex).

Additionally, one or more auxiliary driers may be added to the fully formulated oxidatively curable coating composition. Such auxiliary driers may be optional additional components within, but are often not present in, the formulation of the invention. Such auxiliary driers include fatty acid soaps of zirconium, bismuth, barium, cerium, calcium, lithium, strontium, and zinc. Typically, fatty acid soaps are optionally substituted octanoates, hexanoates and naphthenates. Without being bound by theory, auxiliary driers (sometimes referred to as through driers) are generally understood to diminish the effect of adsorption of the main drier on solid particles often present in an oxidatively curable coating composition. Other non-metal based auxiliary driers may also be present if desired. These may include, for example, thiol compounds, as described in US 2001/0008932 A1 (Bakkeren et al.) or biomolecules as described in US 2005/0245639 A1 (Oostveen et al.). Concentrations of auxiliary driers within oxidatively curable coating compositions (or formulations of the invention) are typically between about 0.01 wt % and 2.5 wt % as is known in the art.

The formulations of the invention (including the fully formulated oxidatively curable coating compositions described herein) may be used as a decorative coating, e.g. applied to wood substrates, such as door or window frames, or for other substrates such as those made of synthetic materials (such as plastics including elastomeric materials), concrete, leather, textile, glass, ceramic or metal, in accordance with the fifth aspect of the invention. The thus-applied composition may then be allowed to cure. In this respect, the third aspect of the invention is directed towards a formulation according to the first aspect, or obtainable according to the second aspect, when cured. The skilled person will understand that one or more of temperature and humidity may be modified in order for any given formulation to cure to an appropriate extent. Heating may be achieved either by the direct application of heat or increasing the ambient temperature in which a formulation may have been applied. The skilled person is able to take such considerations into account, for example when practising a method in accordance with the fifth aspect of the present invention.

Each and every patent and non-patent reference referred to herein is hereby incorporated by reference in its entirety, as if the entire contenOxts of each reference were set forth herein in its entirety.

The invention may be further understood with reference to the following non-nonlimiting clauses:

1. A formulation comprising an oxidatively curable alkyd-based curable resin and a chelant of the formula (I):

(I)

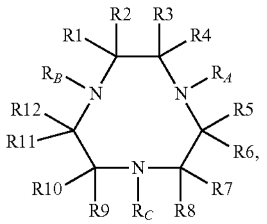

wherein:

each of $R_A$, $R_B$, and $R_C$ is independently selected from the group consisting of $C_{1-24}$alkyl, $C_{6-18}$aryl and $C_{6-18}$aryl$C_{1-6}$alkyl, wherein the aryl moieties of any $C_{6-18}$aryl or $C_{6-18}$aryl$C_{1-6}$alkyl groups are optionally substituted with one or more groups selected from the group consisting of $C_{1-4}$alkyl, Cl, Br and $NO_2$ groups, with the proviso that $R_A$, $R_B$ and $R_C$ are not all the same; and each of $R_1$-$R_{12}$ is independently selected from the group consisting of H, $C_{1-4}$alkyl and hydroxy$C_{1-4}$-alkyl.

2. The formulation of clause 1, wherein each $R_A$, $R_B$, and $R_C$ is independently selected from the group consisting of $C_{1-24}$alkyl, $C_{6-18}$aryl and $C_{6-18}$aryl$C_{1-6}$alkyl, wherein the aryl moieties of any $C_{6-18}$aryl or $C_{6-18}$aryl$C_{1-6}$alkyl groups are optionally substituted with one or more $C_{1-4}$alkyl groups.
3. The formulation of clause 1 or clause 2, wherein $R_A$ is different to $R_B$ and $R_C$ and $R_B$ is the same as $R_C$.
4. The formulation of clause 3 wherein each of $R_B$ and $R_C$ is $C_{1-24}$alkyl.
5. The formulation of clause 3 wherein each of $R_B$ and $R_C$ is $C_{1-8}$alkyl.
6. The formulation of clause 3, wherein each of $R_B$ and $R_C$ is methyl.
7. The formulation of any one of clauses 1 to 6, wherein $R_A$ is selected from the group consisting of $C_{1-24}$alkyl, $C_{6-18}$aryl, $C_{6-18}$aryl$C_{1-6}$alkyl, in which the aryl moieties of any $C_{6-18}$aryl or $C_{6-18}$aryl$C_{1-6}$alkyl groups are optionally substituted with one or more $C_{1-4}$alkyl groups.
8. The formulation of any one of clauses 1 to 7, wherein $R_A$ is selected from the group consisting of $C_{2-24}$alkyl, $C_{6-18}$aryl, $C_{6-18}$aryl$C_{1-6}$alkyl, in which the aryl moieties of any $C_{6-18}$aryl or $C_{6-18}$aryl$C_{1-6}$alkyl groups are optionally substituted with one or more $C_{1-4}$alkyl groups.
9. The formulation of clause 7 or clause 8, wherein $R_A$ is selected from the group consisting of $C_{2-18}$alkyl, $C_{6-10}$aryl and $C_{6-18}$aryl$C_{1-6}$alkyl.
10. The formulation of clause 7 or clause 8, wherein $R_A$ is selected from the group consisting of $C_{2-12}$alkyl, $C_{6-10}$aryl and $C_{6-18}$aryl$C_{1-6}$alkyl.
11. The formulation of clause 7 or clause 8, wherein $R_A$ is selected from the group consisting of $C_{4-12}$alkyl and optionally $C_{1-4}$alkyl-substituted benzyl.
12. The formulation of clause 7 or clause 8, wherein $R_A$ is selected from the group consisting of $C_{4-12}$alkyl, benzyl, 4-methylbenzyl, 2,6-dimethylbenzyl and 3,5-dimethylbenzyl.
13. The formulation of any one of clauses 1 to 12, wherein an aryl moiety of any aryl or arylalkyl group constituting $R_A$ is not substituted with one or more $C_{1-4}$alkyl groups.
14. The formulation of clause 13, wherein $R_A$ is selected from the group consisting of $C_{4-12}$alkyl and benzyl.
15. The formulation of any one of clauses 1 to 14, wherein the aryl moieties of any aryl or arylalkyl groups constituting $R_A$, $R_B$ or $R_C$ are not substituted with one or more $C_{1-4}$alkyl groups.
16. The formulation of any one of clauses 1 to 15, wherein $R_B$ and $R_C$ are both methyl and $R_A$ is benzyl or $C_{4-12}$alkyl.
17. The formulation of any one of clauses 1 to 16, wherein each of $R_1$ to $R_{12}$ is independently selected from hydrogen and $C_{1-4}$alkyl.
18. The formulation of clause 17, wherein each of $R_1$ to $R_{12}$ is independently selected from hydrogen, methyl and ethyl.
19. The formulation of any one of clauses 1 to 18, wherein each of $R_1$ to $R_{12}$ is the same.

20. The formulation of clause 19, wherein each of $R_1$ to $R_{12}$ is hydrogen, methyl or ethyl.

21. The formulation of clause 18, wherein each of $R_1$ to $R_{12}$ is hydrogen.

22. The formulation of any one of clauses 1 to 21, wherein the chelant is present in the formulation at a concentration of between about 0.00005 and about 0.5 wt % with respect to curable resin.

23. The formulation of clause 22, wherein the chelant is present in the formulation at a concentration of between about 0.001 and about 0.1 wt % with respect to curable resin.

24. The formulation of any one of clauses 1 to 23, which is a solvent-based formulation.

25. The formulation of any one of clauses 1 to 24, further comprising an antiskinning agent.

26. The formulation of clause 25, wherein the antiskinning agent is selected from the group consisting of methylethylketone-oxime, 2-pentanone-oxime, acetonoxime, butyraldoxime, dialkylhydroxylamine, ammonia, hydroxylamine, triethylamine, dimethylethanolamine, o-cyclohexylphenol, p-cyclohexylphenol and 2-t-butyl-4-methylphenol.

27. The formulation of any one of clauses 1 to 26, which comprises a complex comprising the chelant and a transition metal ion selected from the group consisting of ions of manganese, iron, vanadium and copper.

28. The formulation of clause 27, wherein the complex comprises a manganese or an iron ion.

29. The formulation of clause 28, wherein the complex comprises a manganese ion.

30. The formulation of any of clause 27 to 29, wherein the complex is not well-defined.

31. The formulation of any one of clauses 1 to 26, which formulation comprises less than 0.00005% by weight of ions of each of manganese, iron, cobalt, vanadium and copper.

32. A method of preparing a formulation as defined in any one of clauses 1 to 31, the method comprising contacting a composition comprising an alkyd-based resin with a composition comprising the chelant of formula (I).

33. The method of clause 32 wherein the formulation is as defined in clause 31.

34. The method of clause 33 further comprising contacting the formulation with a source of transition metal ions.

35. The method of clause 34, wherein the transition metal ions are manganese, iron, vanadium or copper ions.

36. The method of clause 34, wherein the transition metal ions are manganese or iron ions.

37. The method of clause 34, wherein the transition metal ions are manganese ions.

38. The method of clause 34, wherein the manganese ions are manganese (II) and/or manganese (III) ions.

39. The method of any of clauses 34 to 38 wherein a solution of transition metal ions is contacted with the formulation.

40. The method of any one of clauses 34 to 39, wherein the formulation is contacted with an optionally hydrated salt selected from the group consisting of $MnCl_2$, $MnBr_2$, $Mn(NO_3)_2$, $MnSO_4$, Mn(acetylacetonate)$_2$, Mn(acetylacetonate)$_3$, $Mn(R_5COO)_3$, $Mn(R_5COO)_2$, $FeCl_2$, $FeCl_3$, $Fe(NO_3)_3$, $FeSO_4$, (Fe)$_2$(SO$_4$)$_3$, Fe(acetylacetonate)$_2$, Fe(acetylacetonate)$_3$, $Fe(R_5COO)_3$, and $Fe(R_5COO)_2$, wherein each $R_5$ is independently a $C_1$-$C_{24}$ alkyl.

41. The method of any one of clauses 34 to 40, wherein the transition metal ions are manganese ions.

42. The method of clause 41, wherein the formulation is contacted with an optionally hydrated salt selected from the group consisting of $MnSO_4$, $MnCl_2$, $MnBr_2$, $Mn(NO_3)_2$, $Mn(CH_3COO)_3$, $Mn(CH_3COO)_2$, Mn(acetylacetonate)$_2$, Mn(acetylacetonate)$_3$, Mn(octanoate)$_2$, Mn(2-ethylhexanoate)$_2$, Mn(naphthenate)$_2$ and Mn(neodecanoate)$_2$.

43. The method of clause 32, wherein the composition comprising the chelant of formula (I) comprises a complex as defined in clause 30.

44. The method of clause 43, wherein the composition comprising the complex comprises a mixture of the chelant of formula (I) and a salt of the transition metal ion.

45. The method of clause 44, wherein the salt is as defined in any of clauses 39 to 41.

46. The formulation of any one of clauses 1 to 31, which is obtainable by a method as defined in any one of clauses 34 to 45.

47. A composition resultant from curing of a formulation as defined in any one of clauses 27 to 30 and 46.

48. A kit comprising a formulation as defined in clause 31 and, separately, a composition comprising transition metal ions selected from the group consisting of manganese, iron, vanadium and copper ions.

49. The kit of clause 48, wherein the transition metal ions are manganese or iron ions.

50. The kit of clause 49, wherein the ions are provided as a salt as defined in clause 40.

51. The kit of clause 49 or clause 50, wherein the transition metal ions are manganese ions.

52. The kit of clause 51, wherein the ions are provided as a salt as defined in clause 42.

53. A method comprising applying to a substrate a formulation as defined in any one of clauses 27 to 30 and 46.

The non-limiting examples below more fully illustrate the embodiments of this invention.

EXPERIMENTAL

Alkyd resin (catalogue number A/1552/15; an alkyd resin solution of 70 wt % in white spirits) was obtained from Acros Organics. Manganese (II) 2-ethylhexanoate (abbreviated as Mn(2-EH)$_2$ below; catalogue number 93-2532; 40% solution in mineral spirits, 6 wt % Mn) was obtained from Strem Chemicals. Manganese(II) acetate tetrahydrate and Manganese(III) acetate dihydrate were obtained from Aldrich.

All other chemicals used for the ligand synthesis or for the alkyd resin curing tests are obtained from standard chemical suppliers.

The synthesis of 1-heptyl-4,7-dimethyl-1,4,7-triazayclonoane (HpMe$_2$TACN), 1-benzyl-4,7-dimethyl-1,4,7-triazayclonoane (BnMe$_2$TACN), [Mn$_2$($\mu$-O)$_3$(HpMe$_2$TACN)$_2$](PF$_6$)$_2$ and [Mn$_2$($\mu$-O)$_3$(BnMe$_2$TACN)$_2$](PF$_6$)$_2$ has been published by J H Koek et al. (supra, *Inorg. Chim. Acta*, 295, 189-199 (1999)).

Experiment 1a: HpMe$_2$TACN:Mn 1:1 (0.01% Mn)

To 3 g of alkyd resin 1.468 mg HpMe$_2$TACN dissolved in 50 μL $CH_3CN$ was added (it should be noted that in reality about 10 mg of the chelant was weighed and then dissolved in the appropriate amount of acetonitrile. From this solution 50 μL was added to the alkyd resin solution, resulting in an effective dosage of 1.468 mg chelant into the solution containing the alkyd resin). Then, 5 mg of Mn(2-EH)$_2$ dissolved in 50 μL Dowanol PM was added and the mixture was stirred manually for ca. 1 minute. Then this mixture was stored in a closed vial overnight at room temperature. This led to a Mn level of 0.01 wt % with respect to resin solution (or 0.014 wt % with respect to solid resin) and a 1:1 molar ratio Mn:HpMe$_2$TACN. After 24 h, the alkyd/paint was applied using a cube applicator (75 μm) onto a glass plate. The drying process was followed using a BK-3 drying recorder set to 6 h. The curing took place in under ambient conditions, not using a climate chamber. The time when the line on the alkyd coating layer became an interrupted phase has been recorded. A drying time of 2.2 h was measured.

Experiment 1b: HpMe$_2$TACN:Mn 1:1 (0.005% Mn)

To 3 g of alkyd resin 0.734 mg HpMe$_2$TACN dissolved in 50 μL $CH_3CN$ was added. This mixture was stirred manually for ca. 1 minute. Then, 2.5 mg of Mn(2-EH)$_2$ dissolved in 50 μL Dowanol PM was added and the mixture was stirred manually for ca. 1 minute. Then this mixture was stored in a closed vial overnight at room temperature. This led to a Mn level of 0.005 wt % with respect to resin solution (or 0.007 wt % with respect to solid resin) and a 1:1 molar ratio Mn:HpMe$_2$TACN. The drying time was determined as explained above (experiment 1a). A drying time of 2.7 h was measured.

Experiment 1c: HpMe$_2$TACN:Mn 2:1 (0.005% Mn)

To 3 g of alkyd resin 1.468 mg HpMe$_2$TACN dissolved in 50 μL $CH_3CN$ was added. This mixture was stirred manually for ca. 1 minute. Then, 2.5 mg of Mn(2-EH)$_2$ dissolved in 50 μL Dowanol PM was added and the mixture was stirred manually for ca. 1 minute. Then this mixture was stored in a closed vial overnight at room temperature. This led to a Mn level of 0.005 wt % with respect to resin solution (or 0.007 wt % with respect to solid resin) and a 1:2 molar ratio Mn:HpMe$_2$TACN. The drying time was determined as explained above (experiment 1a). A drying time of 2.4 h was measured.

Experiment 1d: HpMe$_2$TACN:Mn 5:1 (0.005% Mn)

To 3 g of alkyd resin 3.67 mg HpMe$_2$TACN dissolved in 50 μL $CH_3CN$ was added. This mixture was stirred manually for ca. 1 minute. Then, 2.5 mg of Mn(2-EH)$_2$ dissolved in 50 μL Dowanol PM was added and the mixture was stirred manually for ca. 1 minute. Then this mixture was stored in a closed vial overnight at room temperature. This led to a Mn level of 0.005 wt % with respect to resin solution (or 0.007 wt % with respect to solid resin) and a 1:5 molar ratio Mn:HpMe$_2$TACN. The drying time was determined as explained above (experiment 1a). A drying time of 2.3 h was measured.

Experiment 1e: [$Mn_2$(μ-O)$_3$(HpMe$_2$TACN)$_2$]($PF_6$)$_2$ (0.05% Mn)

To 3 g of alkyd resin 14 mg [$Mn_2$(μ-O)$_3$(HpMe$_2$TACN)$_2$]($PF_6$)$_2$ dissolved in 100 μL $CH_3CN$ was added. This led to a Mn level of 0.05 wt % with respect to resin solution (or 0.07 wt % with respect to solid resin). The solution was stirred manually for ca. 1 minute and was stored in a closed vial overnight at room temperature. The drying time was determined as explained above (experiment 1a). A drying time of 2.5 h has been observed (it should be noted that the temperature of the curing process was about 2° C. higher than when the experiments 1a-1d were carried out).

Experiment 1f: [$Mn_2$(μ-O)$_3$(HpMe$_2$TACN)$_2$]($PF_6$)$_2$ (0.02% Mn)

To 3 g of alkyd resin 5.6 mg [$Mn_2$(μ-O)$_3$(HpMe$_2$TACN)$_2$]($PF_6$)$_2$ dissolved in 100 μL $CH_3CN$ was added. This led to a Mn level of 0.02 wt % with respect to resin solution (or 0.035 wt % with respect to solid resin). The solution was stirred manually for ca. 1 minute and was stored in a closed vial overnight at room temperature. The drying time was determined as explained above (experiment 1a). A drying time of 2.3 h has been observed (it should be noted that the temperature of the curing process was about 2° C. higher than when the experiments 1a-1d were carried out).

Experiment 1g: [$Mn_2$(μ-O)$_3$(HpMe$_2$TACN)$_2$]($PF_6$)$_2$ (0.01% Mn)

To 3 g of alkyd resin 2.8 mg [$Mn_2$(μ-O)$_3$(HpMe$_2$TACN)$_2$]($PF_6$)$_2$ dissolved in 100 μL $CH_3CN$ was added. This led to a Mn level of 0.01 wt % with respect to resin solution (or 0.014 wt % with respect to solid resin). The solution was stirred manually for ca. 1 minute and was stored in a closed vial overnight at room temperature. The drying time was determined as explained above (experiment 1a). A drying time of about 5 h has been observed (it should be noted that the temperature of the curing process was about 2° C. higher than when the experiments 1a-1d were carried out).

Experiment 2a: BnMe$_2$TACN:Mn 1:1 (0.01% Mn)

To 3 g of alkyd resin 1.35 mg BnMe$_2$TACN dissolved in 50 μL $CH_3CN$ was added. This mixture was stirred manually for ca. 1 minute. Then, 5 mg of Mn(2-EH)$_2$ dissolved in 50 μL Dowanol PM was added and the mixture was stirred manually for ca. 1 minute. Then this mixture was stored in a closed vial overnight at room temperature. This led to a Mn level of 0.01 wt % with respect to resin solution (or 0.014 wt % with respect to solid resin) and a 1:1 molar ratio Mn:BnMe$_2$TACN. The drying time was determined as explained above (experiment 1a). A drying time of 2.9 h was measured.

Experiment 2b: BnMe$_2$TACN:Mn 1:1 (0.005% Mn)

To 3 g of alkyd resin 0.675 mg BnMe$_2$TACN dissolved in 50 μL $CH_3CN$ was added. This mixture was stirred manually for ca. 1 minute. Then, 2.5 mg of Mn(2-EH)$_2$ dissolved in 50 μL Dowanol PM was added and the mixture was stirred manually for ca. 1 minute. Then this mixture was stored in a closed vial overnight at room temperature. This led to a Mn level of 0.005 wt % with respect to resin solution (or 0.007 wt % with respect to solid resin) and a 1:1 molar ratio Mn:BnMe$_2$TACN. The drying time was determined as explained above (experiment 1a). A drying time of 3.0 h was measured.

Experiment 2c: BnMe$_2$TACN:Mn 2:1 (0.005% Mn)

To 3 g of alkyd resin 1.35 mg BnMe$_2$TACN dissolved in 50 μL $CH_3CN$ was added. This mixture was stirred manually for ca. 1 minute. Then, 2.5 mg of Mn(2-EH)$_2$ dissolved in 50 μL Dowanol PM was added and the mixture was stirred manually for ca. 1 minute. Then this mixture was stored in a closed vial overnight at room temperature. This led to a Mn level of 0.005 wt % with respect to resin solution (or 0.007 wt % with respect to solid resin) and a 1:2 molar ratio Mn:$BnMe_2TACN$. The drying time was determined as explained above (experiment 1a). A drying time of 2.8 h was measured.

Experiment 2d: $BnMe_2TACN$:Mn 5:1 (0.005% Mn)

To 3 g of alkyd resin 3.38 mg $BnMe_2TACN$ dissolved in 50 μL $CH_3CN$ was added. This mixture was stirred manually for ca. 1 minute. Then, 2.5 mg of $Mn(2\text{-}EH)_2$ dissolved in 50 μL Dowanol PM was added and the mixture was stirred manually for ca. 1 minute. Then this mixture was stored in a closed vial overnight at room temperature. This led to a Mn level of 0.005 wt % with respect to resin solution (or 0.007 wt % with respect to solid resin) and a 1:5 molar ratio Mn:$BnMe_2TACN$. The drying time was determined as explained above (experiment 1a). A drying time of 2.2 h was measured.

Experiment 2e: $[Mn_2(\mu\text{-}O)_3(BnMe_2TACN)_2](PF_6)_2$ (0.05% Mn) To 3 g of alkyd resin was added 12.8 mg $[Mn_2(\mu\text{-}O)_3(BnMe_2TACN)_2](PF_6)_2$ dissolved in 100 μL $CH_3CN$. This led to a Mn level of 0.05 wt % with respect to resin solution (or 0.07 wt % with respect to solid resin). The solution was stirred manually for ca. 1 minute and was stored in a closed vial overnight at room temperature. The drying time was determined as explained above (experiment 1a). A drying time of 2.4 h was measured (it should be noted that the temperature of the curing process was about 2° C. higher than when the experiments 2a-2d were carried out).

Experiment 2f: $[Mn_2(\mu\text{-}O)_3(BnMe_2TACN)_2](PF_6)_2$ (0.02% Mn)

To 3 g of alkyd resin was added 5.02 mg $[Mn_2(\mu\text{-}O)_3(BnMe_2TACN)_2](PF_6)_2$ dissolved in 100 μL $CH_3CN$. This led to a Mn level of 0.02 wt % with respect to resin solution (or 0.028 wt % with respect to solid resin). The solution was stirred manually for ca. 1 minute and was stored in a closed vial overnight at room temperature. The drying time was determined as explained above (experiment 1a). A drying time of 4 h was measured (it should be noted that the temperature of the curing process was about 2° C. higher than when the experiments 2a-2d were carried out).

Experiment 2g: $[Mn_2(\mu\text{-}O)_3(BnMe_2TACN)_2](PF_6)_2$ (0.01% Mn)

To 3 g of alkyd resin was added 2.56 mg $[Mn_2(\mu\text{-}O)_3(BnMe_2TACN)_2](PF_6)_2$ dissolved in 100 μL $CH_3CN$. This led to a Mn level of 0.01 wt % with respect to resin solution (or 0.014 wt % with respect to solid resin). The solution was stirred manually for ca. 1 minute and was stored in a closed vial overnight at room temperature. The drying time was determined as explained above (experiment 1a). A drying time of 7 h was measured (it should be noted that the temperature of the curing process was about 2° C. higher than when the experiments 2a-2d were carried out).

Comparative Experiments with 1,4,7-trimethyl-1,4,7-triazacyclononane ($Me_3TACN$)

Experiment 3a: $Me_3TACN$:Mn 1:1 (0.01% Mn)

To 3 g of alkyd resin 0.984 mg $Me_3TACN$ dissolved in 50 μL $CH_3CN$ was added. This mixture was stirred manually for ca. 1 minute and was stored in a closed vial overnight at room temperature. Then, 5 mg of $Mn(2\text{-}EH)_2$ dissolved in 50 μL Dowanol PM was added was added and the mixture was stirred manually for ca. 1 minute. This led to a Mn level of 0.01 wt % with respect to resin solution (or 0.014 wt % with respect to solid resin) and a 1:1 molar ratio Mn:$Me_3TACN$. The drying time was determined as explained above (experiment 1a). A drying time of 1.5 h was measured.

Experiment 3b: $Me_3TACN$:Mn 1:1 (0.005% Mn)

To 3 g of alkyd resin 0.492 mg $Me_3TACN$ dissolved in 50 μL $CH_3CN$ was added. This mixture was stirred manually for ca. 1 minute and was stored in a closed vial overnight at room temperature. Then, 2.5 mg of $Mn(2\text{-}EH)_2$ dissolved in 50 μL Dowanol PM was added was added and the mixture was stirred manually for ca. 1 minute. This led to a Mn level of 0.005 wt % with respect to resin solution (or 0.007 wt % with respect to solid resin) and a 1:1 molar ratio Mn:$Me_3TACN$. The drying time was determined as explained above (experiment 1a). A drying time of 3 h and 15 min was measured.

Experiment 3c: $[Mn_2(\mu\text{-}O)_3(Me_3TACN)_2](PF_6)_2$ (0.01% Mn)

To 3 g of alkyd resin was added 2.21 mg $[Mn_2(\mu\text{-}O)_3(Me_3TACN)_2](PF_6)_2$ dissolved in 100 μL $CH_3CN$. This led to a Mn level of 0.01 wt % with respect to resin solution (or 0.014 wt % with respect to solid resin). The solution was stirred manually for ca. 1 minute and was stored in a closed vial overnight at room temperature. The drying time was determined as explained above (experiment 1a). A drying time of 4 h was measured.

It should be noted that no curing within 12 h has been observed when any of these chelant without Mn soap were tested.

Experiment 4: Yellowing Experiments

The yellowing cards are made from Leneta ("Form 2a Opacity Charts"). The top part is black the bottom part is white (yellowness of the white part is around 7). The size of the card is 140 by 254 mm but while only the white part of the card is used (size of 140 by 114 mm). The white part of the card is cut to such extent that it fits well on the glass-plate on which the applicator is used to add a 100 μm layer of the same alkyd resin that was also used in the experiments 1 to 3. The alkyd resin contained 0.01 wt-% Mn with respect to alkyd resin solution (or 0.014 wt-% with respect to the pure alkyd resin), and one molar equivalent of ligand ($Me_3TACN$, $BnMe_2TACN$ and $HpMe_2TACN$ respectively).

After application on the cards, the coated card samples were left to dry overnight and were measured the next day using the Minolta spectrophotometer CM-3700D with the yellowing ASTM YI E313-96 measurement. Then the samples were stored at room temperature in the dark for 2 weeks and then the yellowing was measured again.

TABLE 1

Yellowness and yellowing measurements of alkyd resin with $Mn(2\text{-}EH)_2/Me_3TACN$, with $Mn(2\text{-}EH)_2/BnMe_2TACN$ and with $Mn(2\text{-}EH)_2/HpMe_2TACN$ (in all cases, the Mn:chelant molar ratio was 1:1).

| | Yellowness t = 0 | Yellowness t = 2 weeks | Yellowing |
|---|---|---|---|
| $Mn/Me_3TACN$ | 13.2 | 16.7 | 3.5 |
| $Mn/BnMe_2TACN$ | 10.3 | 11.2 | 0.8 |
| $Mn/HpMe_2TACN$ | 10.8 | 11.0 | 0.2 |

The yellowing after overnight drying was measured (t = 0 values in table) and after 2 weeks storage in the dark (t = 2 weeks in the table). The yellowing in the last column shows the difference between the t = 2 and t = 0.

The results from the experiments indicate the following:

Both $HpMe_2TACN$ and $BnMe_2TACN$ show clear acceleration of the curing of the alkyd resin upon mixing with $Mn(2\text{-}EH)_2$.

The well-defined manganese complexes with the same chelants show also curing activity of the alkyd resin, albeit somewhat slower than that observed for the mixtures of $Mn(EH)_2$ and chelants.

Lower levels of Mn (0.005 wt-% with respect to the alkyd resin) with equimolar chelant leads to slower curing as compared to the tests with the higher levels of Mn (0.01 wt-%) with equimolar chelant, as expected.

Addition of molar excess of chelant to $Mn(EH)_2$ leads to increased curing activity as compared to the analogous tests with an equimolar amount of Mn and chelant.

In comparison with the comparative experiments using $Me_3TACN$, both chelants show a similar or somewhat slower curing activity.

The white card with the alkyd resin containing $Mn(2\text{-}EH)_2$ with $Me_3TACN$ shows the highest value for initial yellowness and it also shows the largest increase in yellowing over time. The analogous tests with $BnMe_2TACN$ and $HpMe_2TACN$ show not only much lower initial yellowness values, they also show that the yellowing values are much smaller. Therefore, the two unsymmetric TACN ligands show with $Mn(2\text{-}EH)_2$ much less tendency to induce yellowing of alkyd resins during storage in the dark.

The invention claimed is:

1. A formulation comprising:

an oxidatively curable alkyd-based curable resin and a chelant of the formula (I):

(I)

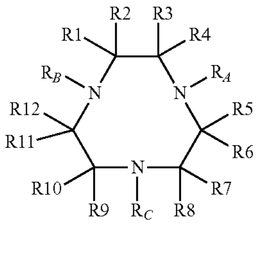

wherein:

$R_B$ and $R_C$ are both methyl;

$R_A$ is different to $R_B$ and $R_B$ is the same as $R_C$;

$R_A$ is benzyl or $C_{4-12}$alkyl; and each of $R_1$-$R_{12}$ is the same and is hydrogen or $C_{1-4}$alkyl, and a complex which comprises the chelant and a transition metal ion selected from ions of manganese, wherein a molar ratio between the transition metal ion and the chelant in the formulation is between about 0.3:1 to 3:1.

2. The formulation of claim 1, wherein each of $R_1$-$R_{12}$ is the same and is hydrogen.

3. The formulation of claim 1, wherein the complex is not isolated from the reaction medium in which it is prepared.

4. A method of preparing a formulation, the method comprising contacting a composition comprising an alkyd-based resin with a composition comprising a chelant of formula (I):

(I)

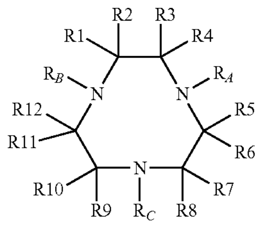

wherein:

$R_B$ and $R_C$ are both methyl;

$R_A$ is different to $R_B$ and $R_B$ is the same as $R_C$;

$R_A$ is benzyl or $C_{4-12}$alkyl; and each of $R_1$-$R_{12}$ is the same and is hydrogen or $C_{1-4}$alkyl, and the method further comprising a step of contacting the composition comprising an alkyd-based resin with a source of manganese transition metal ion, wherein a molar ratio between the manganese transition metal ion and the chelant in the resultant formulation is between about 0.3:1 to 3:1.

5. The method of claim 4, wherein the formulation formed by the method of claim 4 comprises a well-defined complex formed of the chelant of formula (I) and the manganese transition metal ion.

6. A kit comprising a first formulation comprising the alkyd-based curable resin and chelant of claim 1 and, separately, a composition comprising the transition metal ion of claim 1.

7. The formulation of claim 1, wherein the chelant is present in the formulation at a concentration of between about 0.00005 and about 0.5 wt. % with respect to oxidatively curable alkyd-based curable resin.

8. The formulation of claim 7, wherein the chelant is present in the formulation at a concentration of between about 0.001 and about 0.1 wt. % with respect to oxidatively curable alkyd-based curable resin.

9. The formulation of claim 1, further comprising an antiskinning agent.

10. The method of claim 4, wherein the source of transition metal ion is an optionally hydrated salt selected from the group consisting of $MnSO_4$, $MnCl_2$, $MnBr_2$, $Mn(NO_3)_2$, $Mn(CH_3COO)_2$, $Mn(CH_3COO)_2$, Mn(acetylacetonate)$_2$, Mn(acetylacetonate)$_3$, Mn(octanoate)$_2$, Mn(2-ethylhexanoate)$_2$, Mn(naphthenate)$_2$, and Mn(neodecanoate)$_2$.

* * * * *